(12) United States Patent
Skiles et al.

(10) Patent No.: US 7,910,220 B2
(45) Date of Patent: Mar. 22, 2011

(54) SURFACES AND COATINGS FOR THE REMOVAL OF CARBON DIOXIDE

(75) Inventors: Jean Ann Skiles, Gibsonia, PA (US);
Paula L. Kolek, Tarentum, PA (US);
Carroll D. Davis, Irwin, PA (US);
Albert L. Askin, Lower Burrell, PA (US); Robert J. Speer, Upper Burrell, PA (US); Weizong Xu, Murrysville, PA (US); Lori A. Barrage, Natrona Heights, PA (US); Luis H. Espinoza-Nava, Monroeville, PA (US); Verne Bergstrom, Natrona Heights, PA (US)

(73) Assignee: Alcoa Inc., Pittsburgh, PA (US)

( * ) Notice: Subject to any disclaimer, the term of this patent is extended or adjusted under 35 U.S.C. 154(b) by 819 days.

(21) Appl. No.: 11/828,305

(22) Filed: Jul. 25, 2007

(65) Prior Publication Data
US 2009/0026063 A1    Jan. 29, 2009

(51) Int. Cl.
*B32B 9/00*    (2006.01)
(52) U.S. Cl. ........ 428/469; 428/470; 428/472; 428/432; 428/699; 428/697; 428/701; 428/702
(58) Field of Classification Search .................. 428/432, 428/699, 697, 701, 702, 469, 470, 472
See application file for complete search history.

(56) References Cited

U.S. PATENT DOCUMENTS

| | | | |
|---|---|---|---|
| 5,707,915 A | 1/1998 | Taoda | 520/159 |
| 5,753,322 A | 5/1998 | Yamaguchi et al. | 428/14 |
| 5,755,867 A | 5/1998 | Chikuni et al. | 106/287.16 |
| 5,853,866 A | 12/1998 | Watanabe et al. | 428/312.8 |
| 5,874,701 A | 2/1999 | Watanabe et al. | 204/157.15 |
| 5,939,194 A | 8/1999 | Hashimoto | 428/411.1 |
| 5,961,843 A | 10/1999 | Hayakawa et al. | 210/748 |
| 6,013,372 A | 1/2000 | Hayakawa et al. | 428/411.1 |
| 6,037,289 A | 3/2000 | Chopin et al. | 502/2 |
| 6,090,489 A | 7/2000 | Hayakawa et al. | 428/409 |
| 6,165,256 A | 12/2000 | Hayakawa et al. | 106/13 |
| 6,191,062 B1 | 2/2001 | Hayakawa et al. | 502/159 |
| 6,337,129 B1 | 1/2002 | Watanabe et al. | 428/328 |
| 6,368,668 B1 | 4/2002 | Kobayashi et al. | 427/376.2 |
| 6,440,290 B1 | 8/2002 | Vega et al. | 205/201 |
| 6,602,918 B1 | 8/2003 | Ichinose | 516/90 |
| 6,673,433 B1 | 1/2004 | Saeki et al. | 428/323 |
| 6,716,513 B1 | 4/2004 | Hasuo et al. | 428/141 |
| 6,884,752 B2 | 4/2005 | Andrews | 502/349 |
| 7,067,092 B2 * | 6/2006 | Hall et al. | 423/239.1 |
| 7,205,049 B2 | 4/2007 | Andrews | 428/403 |

(Continued)

FOREIGN PATENT DOCUMENTS

EP    0 846 494    6/1998

(Continued)

OTHER PUBLICATIONS

*Federal Register*, vol. 72, No. 126, pp. 35991-35992 (Jul. 2, 2007).

(Continued)

*Primary Examiner* — Gwendolyn Blackwell
(74) *Attorney, Agent, or Firm* — Greenberg Traurig, LLP

(57) ABSTRACT

Apparatus suited for removing carbon dioxide from gases are disclosed. The apparatus may employ bodies having a photocatalytic film. Associated methods and compositions are also disclosed.

16 Claims, 14 Drawing Sheets

U.S. PATENT DOCUMENTS

| | | |
|---|---|---|
| 2004/0072684 A1 | 4/2004 | Tsujimichi et al. ............ 502/242 |
| 2005/0257790 A1 | 4/2005 | McNeirney .............. 128/203.12 |
| 2006/0186562 A1 | 2/2006 | Wright et al. .................... 261/94 |
| 2006/0264520 A1 | 11/2006 | Sonezaki et al. ................. 516/90 |
| 2006/0289003 A1 | 12/2006 | Lackner et al. .......... 128/200.24 |
| 2007/0017567 A1 | 1/2007 | Gronet et al. ................. 136/246 |
| 2007/0099002 A1 | 5/2007 | Walters et al. ................ 428/446 |
| 2008/0003367 A1 | 1/2008 | Stratton ..................... 427/372.2 |
| 2008/0031801 A1 | 2/2008 | Lackner et al. ............... 423/438 |
| 2008/0087165 A1 | 4/2008 | Wright et al. ..................... 95/51 |

FOREIGN PATENT DOCUMENTS

| | | |
|---|---|---|
| EP | 1 449 811 | 8/2004 |
| JP | 9-57912 | 3/1997 |
| JP | 2756474 | 3/1998 |
| JP | 10-156999 | 6/1998 |
| JP | 2924902 | 5/1999 |
| JP | 2939524 | 6/1999 |
| WO | WO0224333 | 3/2002 |
| WO | WO2006038326 | 4/2006 |
| WO | WO2006084008 | 8/2006 |
| WO | WO2007016271 | 2/2007 |
| WO | WO2007018147 | 2/2007 |
| WO | WO 2007/026387 | 3/2007 |
| WO | WO2007034586 | 3/2007 |
| WO | WO2007114991 | 10/2007 |
| WO | WO2008061210 | 5/2008 |

OTHER PUBLICATIONS

Ricart, J., *Theoretical Study of $CO_2$ Activation on Pt (111) Induced by Coadsorbed K Atoms*, Surface Science, 460, pp. 170-181, (2000).

Richards, B., *Novel Uses of Titanium Dioxide for Silicon Solar Cells*, Thesis-Doctor of Philosophy-University of New South Wales, pp. 1-255, (2002).

Zeman, F., *Energy and Material Balance of $CO_2$ Capture from Ambient Air*, Environ. Sci. Technol., vol. 41, No. 21, pp. 7558-7563, (Sep. 26, 2007).

Commonly-Owned U.S. Appl. No. 11/952,333, pp. 1-23.

International Search Report and Written Opinion from corresponding PCT Application No. PCT/US2008/070276.

XP-002517944 "TPX-HP Material Safety Data Sheet", pp. 1-2 (Nov. 11, 2004).

XP-002517944 "TPX-AD Material Safety Data Sheet", pp. 1-2 (Nov. 11, 2004).

Brause, M., et al., "$CO_2$ Chemisorption on Alkalated $TiO_2$(100)-(1x3) Studied with MIES and UPS (HeI)," *Surface Science*, 476:78-84 (2001).

"Photocatalysis Applications of Titanium Dioxide Ti02," retrieved from the Internet on Dec. 20, 2007, at http://www.titaniumart.com/photocatalysis-ti02.html.

"Photocatalytic Oxidation," Clean Water Programme, Nanyang Technological University web site, retrieved from the Internet on Dec. 20, 2007, at http://www.ntu.edu.sg/cwp/pco.htm.

"Pilkington Active—Self-cleaning glass," Pilkington Group Limited web site, retrieved from the Internet on May 22, 2008, at http://www.pilkington.com/international+products/active/default.htm.

"Status and Future Directions of the High Production Volume Challenge Program," Environmental Protection Agency, Office of Pollution Prevention and Toxics, pp. 1-108 (Nov. 2004).

"The Ultimate Comfort: SunClean Self-Cleaning Windows," PPG Industries web site, retrieved from the Internet on Jan. 2, 2008, at http://corporateportal.ppg.com/NA/Glass/ResidentialGlass/Residential_BuildersRemodelers/...

* cited by examiner

SURFACES AND COATINGS FOR THE REMOVAL OF CARBON DIOXIDE

BACKGROUND OF THE INVENTION

Carbon dioxide is a byproduct of many chemical reactions. Carbon dioxide is also considered a greenhouse gas and its emissions are of growing concern in the United States and abroad. In 2007, the United States Supreme Court found that the Environmental Protection Agency is required to evaluate carbon dioxide emissions under the Clean Air Act. Over 100 other countries have already agreed to regulate greenhouse gas emissions, including carbon dioxide gas, under the Kyoto Protocol.

SUMMARY OF THE INVENTION

The instant invention relates to, without limitation, apparatus, systems and methods for removing carbon dioxide from gases and compositions relating thereto.

In one aspect, bodies capable of converting carbon dioxide to non-carbon dioxide gases are provided. In one approach, a body includes a substrate, a photocatalytic film disposed on the substrate and a receptor agent in communication with the photocatalytic film. The bodies are generally capable of removing at least about 10 ppm/minute $CO_2$ gas from a gas stream comprising 1 vol. % $CO_2$ (e.g., per square meter of available photocatalytic film surface area).

In one embodiment, the receptor agent is included in a portion of at least one of the substrate and the photocatalytic layer. In one embodiment, the receptor agent is included in one or more separate receptor layers that are in communication with the photocatalytic layer. In one embodiment, a receptor layer is located between the substrate and the photocatalytic layer. In one embodiment, the photocatalytic layer is located between the substrate and the receptor layer. In one embodiment, the receptor agent is an alkaline material. In one embodiment, the receptor agent comprises calcium.

In one embodiment, the photocatalytic film includes a matrix. In one embodiment, semiconductor particles and charge transfer agent are dispersed within the matrix. In one embodiment, the ratio of semiconductor particles to charge transfer agent in the matrix is greater than 1:1. In one embodiment, the ratio of semiconductor particles to charge transfer agent in the matrix is at least about than 1.5:1. In one embodiment, the ratio of semiconductor particles to charge transfer agent in the matrix is at least about than 1.7:1.

In one embodiment, at least some of the matrix is amorphous titanium dioxide. In one embodiment, at least some of the semiconductor particles are titanium dioxide particles. In one embodiment, at least some of the charge transfer agent is an alkaline material. In a particular embodiment, the alkaline material comprises sodium.

In one embodiment, the photocatalytic film includes a pollution attraction agent. In one embodiment, at least some pollution attraction agent is dispersed within the matrix of the photocatalytic film. In one embodiment, the pollution attraction agent comprises at least one of a silicate-containing mineral, a phosphate-containing mineral and a combination thereof.

In one embodiment, the substrate is metal-based. In one embodiment, the substrate is an aluminum-based substrate. In one embodiment, the substrate is selected from the group consisting of aluminum alloys and aluminum foams. In one embodiment, the substrate is a photovoltaic cell. In one embodiment, the substrate predominantly comprises a non-metal. In one embodiment, the substrate comprises a metal oxide. In one embodiment, the substrate comprises alumina, such as alumina in tabular or particulate form. In one embodiment, the substrate comprises carbon. In one embodiment, the substrate comprises a surface area of at least about 1 $m^2$/gram.

Additional layers may be included with the bodies. In one embodiment, a body includes an organic layer between the substrate and the photocatalytic film. In one embodiment, a body includes a barrier layer. In one embodiment, the barrier layer is located between the photocatalytic film and the organic layer.

The body may be of any suitable form. In one embodiment, the body is a gas scrubbing apparatus. In one embodiment, the gas scrubbing apparatus comprises a gas entrance, a gas exit, and a plurality of bodies located between the gas entrance and the gas exit. At least some of the bodies include a photocatalytic film and/or receptor agent. In one embodiment, the gas scrubbing apparatus is capable of removing at least about 10 ppm/minute carbon dioxide gas from a gas stream comprising 1 vol. % carbon dioxide. In one embodiment, the gas scrubbing apparatus is a bed. In one embodiment, the gas scrubbing apparatus is a packed bed. In one embodiment, the gas scrubbing apparatus is a fluidized bed. In one embodiment, the gas scrubbing apparatus is a rebreather.

In another aspect, mixtures for producing photocatalytic films are provided. In one approach, a mixture includes a solvent, semiconductor particles, a film former and charge transfer material. In one embodiment, the mixture comprises a ratio of semiconductor particles to charge transfer material of at least about 1:1. In one embodiment, the mixture comprises a ratio of semiconductor particles to charge transfer material of at least about 1.5:1. Upon application to a substrate, the mixture may be converted to a photocatalytic film that is capable of removing carbon dioxide from gases. In particular, the film former may dispersed within the solvent, wherein the film former is capable of forming an amorphous film upon application to a substrate. In one embodiment the film former is a semiconductor precursor. In one embodiment, the film former is peroxotitanic acid.

In one embodiment, the semiconductor particles of the mixture have an average particle size of not greater than 500 nanometers. In one embodiment, the semiconductor particles comprise titanium dioxide. In one embodiment, the charge transfer material of the mixture comprises an alkali element. In one embodiment, the alkali element is sodium. In one embodiment, the charge transfer material comprises an alkali salt. In one embodiment, the alkali salt is sodium hydroxide.

In one embodiment, the mixture includes a pollution attraction agent dispersed within the solvent. In one embodiment, the pollution attraction agent comprises a silicate-containing mineral. In one embodiment, the pollution attraction agent comprises a phosphate-containing mineral.

Methods for converting carbon dioxide to non-carbon dioxide products are also provided. In one embodiment, a method includes the steps of contacting a body comprising a photocatalytic film with a carbon dioxide-containing gas and converting, via the body, at least 10 ppm/minute carbon dioxide to non-carbon dioxide products per square meter of photocatalytic film surface area. In one embodiment, the converting step includes reacting, in the presence of light, carbon dioxide gas with at least one of the semiconductor material and the charge transfer agent to produce a non-carbon dioxide product. In one embodiment, the converting step occurs at about ambient conditions. In one embodiment, the converting step includes producing a carbonate-containing end product via a receptor agent. In one embodiment, the charge transfer agent comprises a first alkaline material and the receptor agent comprises a second alkaline material, different than the first alkaline material. In one embodiment, the first alkaline material comprises sodium and the second alkaline material comprises calcium.

Methods of removing carbon dioxide from gases via gas scrubbing apparatus are also provided. In one embodiment, a method includes the steps of flowing an incoming gas stream comprising carbon dioxide through a gas scrubbing apparatus comprising a photocatalytic film and removing, via the photocatalytic film, at least 10 ppm/minute carbon dioxide from the incoming gas stream. In one embodiment, carbon dioxide is removed from the incoming gas stream at a rate of at least about 0.5 vol. % per hour. In one embodiment, the flowing and producing steps occur at about ambient conditions. In one embodiment, the method includes discharging an effluent gas stream from the gas scrubbing apparatus. In one embodiment, the concentration of carbon dioxide in the effluent gas stream is at least about 1% less than the concentration of carbon dioxide in the incoming gas stream. In one embodiment, the concentration of carbon dioxide in the effluent gas stream is at least about 5% less than the concentration of carbon dioxide in the incoming gas stream. In one embodiment, the concentration of carbon dioxide in the effluent gas stream is at least about 50% less than the concentration of carbon dioxide in the incoming gas stream. In one embodiment, the concentration of carbon dioxide in the effluent gas stream is at least about 95% less than the concentration of carbon dioxide in the incoming gas stream. In one embodiment, the concentration of carbon dioxide in the effluent gas stream is at least about 99% less than the concentration of carbon dioxide in the incoming gas stream.

Various ones of the inventive aspects noted hereinabove may be combined to yield various apparatus, systems and methods capable of and for removing carbon dioxide from gases. These and other aspects, advantages, and novel features of the invention are set forth in part in the description that follows and will become apparent to those skilled in the art upon examination of the following description and figures, or may be learned by practicing the invention.

DETAILED DESCRIPTION OF THE INVENTION

The instant application discloses compositions for creating films that remove carbon dioxide from gases (e.g., gas streams, the atmosphere). Bodies including one or more of these films are also disclosed. Methods of producing such compositions, films, and bodies are also disclosed. Methods of removing carbon dioxide from gases are also disclosed.

Figure 1:
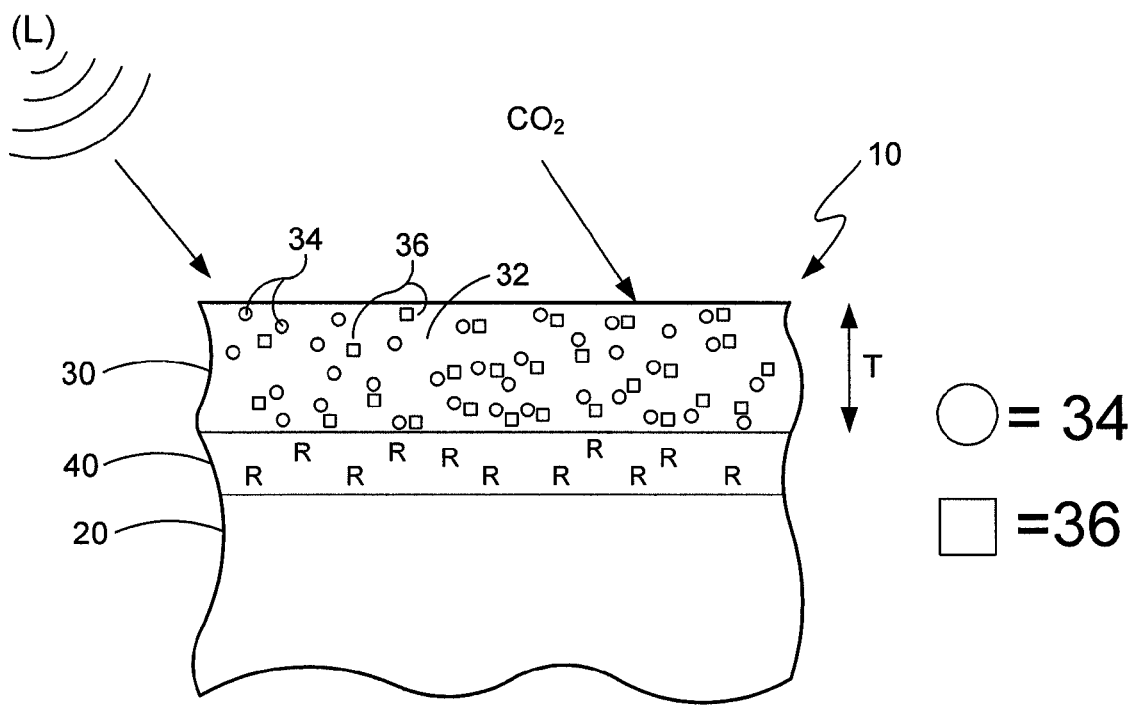
FIGS. 1-2 illustrates one embodiment of a body suited for removing carbon dioxide from gases.
Figure 2:
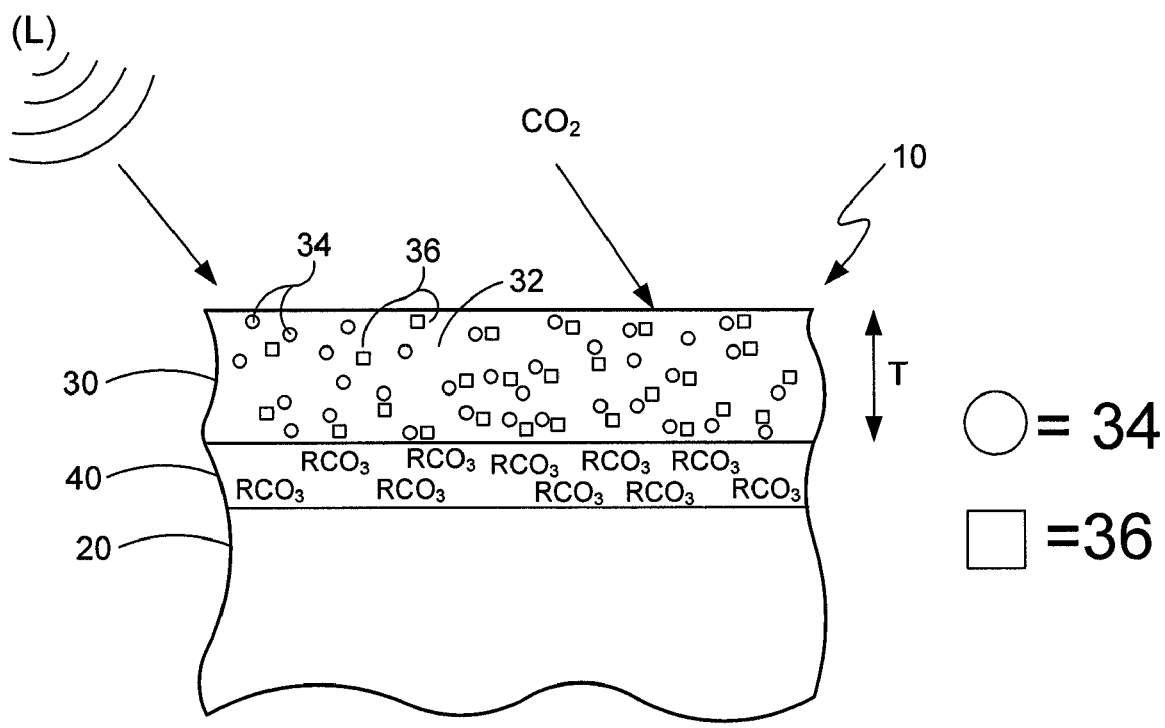

Reference will now be made to the accompanying drawings, which at least assist in illustrating various pertinent embodiments of the present invention. One embodiment of a body suited to remove carbon dioxide from gases is illustrated in FIGS. 1-2. In the illustrated embodiment, the body 10 comprises a substrate 20, a photocatalytic film 30 and a receptor layer 40. The photocatalytic film 30 includes semiconductor particles 34 and charge transfer agent 36. The receptor layer 40 includes receptor agent (R).

As described in further detail below, the photocatalytic film 30 is capable of catalytically interacting with carbon dioxide in the presence of light (L) and/or suitable oxygen-containing materials (e.g., oxygen gas, water) to produce intermediate species (e.g., carbonate anions $CO_3^{2-}$). The receptor agent R of the receptor layer 40 may interact with these intermediate species to create non-carbon dioxide end products, such as carbonate-containing end products (e.g., $RCO_3$). In general, the body 10 is capable of removing at least about 10 ppm/minute $CO_2$ gas from a gas stream comprising 1% vol. $CO_2$.

As used herein, "photocatalytic" means catalytic activity induced by, or promoted by, the presence of light (L). As used herein, a "photocatalytic film" is a film that is capable of photocatalytic activity. As used herein, "intermediate species" means products produced from the interaction of carbon dioxide and a photocatalytic film, but not including carbon dioxide itself. Some intermediate species that may be produced include carbonate anions (e.g., $CO_3^{2-}$). As used herein, "receptor agent" means any element or compound capable of interacting with intermediate species (e.g. via covalent or ionic bonding) to produce non-carbon dioxide end products. Some non-carbon dioxide end products that may be produced include carbonate-containing end products (e.g., $CaCO_3$). As used herein, "non-carbon dioxide products" means at least one of intermediate species and non-carbon dioxide end products.

In the illustrated embodiment, the photocatalytic film 30 includes a matrix 32, semiconductor particles 34, and charge transfer agent 36. The receptor layer 40 includes receptor agent R. The body 10 includes a sufficient amount of semiconductor particles 34, charge transfer agent 36 (sometimes referred to herein as "CTA") and receptor agent R to remove at least about 10 ppm/minute carbon dioxide from a gas stream comprising 1 vol. % carbon dioxide, particularly in the presence of light and/or oxygen-containing materials. The body 10 generally includes charge transfer agent 36 and semiconductor particles 34 in a ratio of not greater than 1:1 so as to promote catalytic activity toward carbon dioxide.

The semiconductor particles 34 may be any particles comprising a semiconductor. As used herein, a "semiconductor" is any of various solid crystalline substances, for example, germanium, titanium, indium or silicon, or the oxides of these crystalline substances, having a band gap energy of less than 4.0 electron volts (eV). Band gap energy is the energy that electrons must have to move from a valence band to a conduction band. Semiconductors may comprise electrons that are excitable by light to release energy. With respect to the instant invention, and as described in further detail below, this energy release may be utilized to initiate a reaction sequence involving the charge transfer agent, carbon dioxide and at least one of oxygen and water, to remove carbon dioxide from gases.

In one embodiment, at least some of the semiconductor particles 34 are titanium dioxide particles. In one embodiment, all of the semiconductor particles 34 are titanium dioxide particles. In one embodiment, most of, or even all of, the titanium dioxide particles are in anatase form. Titanium dioxide in anatase crystalline form has a band gap of about 3.2 eV. In other embodiments, at least some of the titanium dioxide particles are in rutile form. In some embodiments, very small amounts of, or even none of, the titanium dioxide particles are in brookite form. Any suitable combination of semiconductor particles 34 may be utilized (e.g., a first semiconductor material comprising anatase titanium dioxide and a second semiconductor material comprising another titanium dioxide material, silicon, indium or germanium).

The semiconductor particles 34 may be any suitable size. As used herein, "particle" means any body having a finite mass and internal structure but having relatively small dimensions. In one embodiment, the semiconductor particles 34 have an average particle size of not greater than 1000 nm. As used herein, "average particle size" means the average of the diameters of the semiconductor particles 34, either in the matrix 32 of the photocatalytic film 30, or in a mixture utilized to produce the photocatalytic film 30 (discussed in further detail below). In one embodiment, the semiconductor particles 34 have an average particle size of at least about 1 nm. In one embodiment, the semiconductor particles have an average particle size of not greater than 100 nm, such as an average particle size of not greater than 50 nm, or even an average particle size of not greater than 20 nm. In one embodiment, the semiconductor particles 34 have an average particle size of at least about 5 nm. In one embodiment, the semiconductor particles 34 have an average particle size in the range of about 10 nm to about 50 nm.

The semiconductor particles 34 may be included in the matrix 32 in any suitable manner so long as exposure to light and/or carbon dioxide gas is facilitated. Generally, the semiconductor particles 34 are homogenously dispersed throughout the matrix 32, as illustrated. However, in other embodiments, the semiconductor particles 34 may be selectively located in only certain regions of the matrix 32 (e.g., via selective deposition processes).

Charge transfer agent 36 is included within the matrix 32 to facilitate conversion of carbon dioxide to non-carbon dioxide products. Generally, the amount of charge transfer agent 36 in the matrix 32 may not exceed the amount of semiconductor particles 34 in the matrix. As used herein, "charge transfer agent" means any compound or element that, in conjunction with the semiconductor particles, facilitates the photocatalytic production of non-carbon dioxide products from carbon dioxide. It is believed that the charge transfer agent catalytically facilitates conversion of carbon dioxide to intermediate species by transferring at least one electron, or a partial electron charge, between a donor and an acceptor, preferring the acceptor. With respect to the instant disclosure, it is believed that the carbon dioxide is the acceptor and the charge transfer agent is the donor.

In one embodiment, the charge transfer agent 36 comprises an alkaline material. As used herein, "alkaline material" means any Group I or Group II element, or a compound thereof. Particularly useful alkaline materials for use as charge transfer agent include the oxides and hydroxides of sodium. Other charge transfer agents may be utilized. The photocatalytic film 30 may include any suitable combination of charge transfer agents 36 (e.g., a plurality of materials, such as first and second charge transfer agent materials of differing composition). As noted above, the charge transfer agent 36 may catalytically interact with the semiconductor particles 34 to facilitate a reaction sequence that removes carbon dioxide from gases and produces non-carbon dioxide products. Thus, charge transfer agent 36 may not be consumed during the reaction sequence.

Charge transfer agent 36 may be included in the matrix 32 in any suitable manner that facilitates conversion of carbon dioxide to non-carbon dioxide products via the semiconductor particles 34 and charge transfer agent 36. In general, the amount of charge transfer agent 36 in the matrix 32 may not exceed the amount of semiconductor particles 34 in the matrix. In one embodiment, at least some charge transfer agent 36 is located proximal at least some semiconductor particles 34. In one embodiment, at least some charge transfer agent 36 does not obscure the semiconductor particles 34 from the light (L). In other words, at least some charge transfer agent 36 may be absent from the area in the photocatalytic film 30 in which the light (l) interfaces with the semiconductor particles 34. In one embodiment, the charge transfer agent 36 is homogenously dispersed throughout the matrix 32, as illustrated. However, in other embodiments, the charge transfer agent 36 may be selectively located in only certain regions of the matrix 32 (e.g., via selective deposition techniques). The charge transfer agent 36 may take on various forms within the matrix 32, such as alkaline ions that communicate (e.g., electrically communicate, physically communicate) with adjacent semiconductor particles 34, the matrix 32, and/or other materials of the photocatalytic film (e.g., pollution attraction agents, discussed in further detail below).

The matrix 32 contains the semiconductor particles 34, and, in some embodiments, the charge transfer agent 36. As used herein, "matrix" means a substance within which something else originates, develops, or is contained. The matrix 32 may include sufficient semiconductor particles 34 and charge transfer agent 36 to facilitate the photocatalytic conversion of carbon dioxide to non-carbon dioxide products. In one embodiment, the matrix comprises a solid-phase material containing the semiconductor particles 34 and charge transfer agent 36.

In one embodiment, the matrix 32 is amorphous. As used herein, "amorphous" means a solid-phase or near solid-phase material in which there is no long-range order of the positions of the atoms. In one embodiment, the matrix 32 is crystalline. As used herein, "crystalline" means a solid in which the atoms, ions or molecules are arranged in a three-dimensional repetitive pattern. In some embodiments, the matrix 32 comprises a majority of amorphous material, and little or no crystalline material. In one embodiment, the matrix comprises at least 50% amorphous material, such as at least 95% amorphous material.

The matrix 32 generally comprises sufficient porosity to facilitate interaction between light (L), fluids (e.g., water, air, carbon dioxide, oxygen, pollutants), the semiconductor particles 34, charge transfer agent 36 and/or receptor agent R. In one embodiment, the matrix 32 comprises sufficient porosity to facilitate interaction of light and/or fluids with intermediate layers of the body 10 (e.g., a receptor layer, described below).

In one embodiment, the matrix 32 is at least partially formed from a semiconductor material. In one embodiment, this semiconductor material is coincidental to the semiconductor material of the semiconductor particles 34. For example, the semiconductor particles 34 may comprise titanium dioxide and the matrix 32 may comprise amorphous titanium dioxide. In another embodiment, the semiconductor particles 34 may comprise titanium dioxide and the matrix may comprise amorphous silicon.

As noted, the photocatalytic film 30 is capable of producing non-carbon dioxide products (e.g., intermediate species) from carbon dioxide gas via the semiconductor particles 34 and charge transfer agent 36. The photocatalytic film 30 may contain sufficient semiconductor particles 34 and charge transfer agent 36 to photocatalytically convert carbon dioxide to non-carbon dioxide products. Thus, non-carbon dioxide products may be produced due to interaction of carbon dioxide with the semiconductor particles 34 and charge transfer agent 36, and without consumption of the semiconductor particles 34 or the charge transfer agent 36. Hence, the semiconductor particles 34 and charge transfer agent 36 may at least partially define a catalyst that is capable of catalytically interacting with carbon dioxide in the presence of light (L) to produce non-carbon dioxide products. In one embodiment, the semiconductor particles 34 and the charge transfer agent 36 may catalytically assist in removing carbon dioxide from gases, and the semiconductor particles 34 and charge transfer agent 36 may not be consumed in the reaction process. In turn, the photocatalytic film 30 may be relatively stable and may not be consumed during production of non-carbon dioxide products from carbon dioxide.

The photocatalytic film 30 should not contain too much charge transfer agent 36 relative to the semiconductor particles 34, or catalytic activity of the photocatalytic film 30 may be reduced. In particular, the photocatalytic film 30 should not contain too much charge transfer agent 36 or the catalytic activity of the semiconductor particles 34 may be poisoned. In one embodiment, the ratio of semiconductor particles 34 to charge transfer agent 36 in the photocatalytic film 30 is at least about 1:1 (semiconductor particles: charge transfer agent), such as at least about 5:1, or even at least about 10:1. However, too little charge transfer agent 36 in the photocatalytic film 30 may not facilitate sufficient carbon dioxide conversion rates. In one embodiment, the ratio of semiconductor particles 34 to charge transfer agent 36 in the film is not greater than about 100:1, such as not greater than about 75:1, or even not greater than about 50:1, or even not greater than about 25:1. In one embodiment, the ratio of semiconductor particles to charge transfer agent within the film is in the range of about 1:1 to about 25:1.

In a particular embodiment, the charge transfer agent comprises an alkaline material. In general, and as described above, the amount of alkaline material in the matrix should not exceed the amount of semiconductor particles in the matrix. In one embodiment, compositions used to produce the photocatalytic film 30 (e.g., liquid mixtures) may contain at least about 0.01 wt % alkaline material, so as to facilitate production of a photocatalytic film having catalytic activity toward carbon dioxide. The compositions used to produce the photocatalytic film 30 may contain not greater than 5.0 wt % alkaline material, so as to restrict the possibility of producing a photocatalytic film having reduced or no catalytic activity toward carbon dioxide (or even other materials) due to excess alkaline material.

The receptor layer 40 includes receptor agent R. As noted, the receptor agent R may, in conjunction with a photocatalytic film (e.g. photocatalytic film 30, or a conventional photocatalytic film, described below), facilitate production of non-carbon dioxide products from carbon dioxide. The receptor layer 40 may thus comprise one or more receptor agents R disposed within a matrix. Like the photocatalytic film 30, the matrix of the receptor layer 40 may be an amorphous material, a crystalline material or a combination thereof.

The receptor agent R may be any material suited to produce non-carbon dioxide end products. In one embodiment, the receptor agent R is any material suited to form a stable carbonate compound. In one embodiment, the receptor agent R comprises an alkaline material. In one embodiment, the receptor agent R is the element calcium or a compound thereof. In one embodiment, the receptor agent comprises an oxide or hydroxide of calcium. In one embodiment, the non-carbon dioxide end products comprise carbonate-containing materials. In one embodiment, the non-carbon dioxide end products comprise calcium carbonate. In one embodiment, the receptor agent R comprises a metal. In one embodiment, the receptor agent R comprises lithium. In one embodiment, the receptor layer comprises magnesium. In one embodiment, the receptor agent R comprises aluminum. The body 10 may comprise any suitable combination of receptor agents (e.g., a plurality of receptor agents, such as first, second or even more receptor agents of differing materials). Since the receptor agent R may form chemical bonds with the intermediate species to produce non-carbon dioxide end products, the receptor layer 40 may become saturated over time.

The receptor layer 40 may comprise any amount of receptor agent R to facilitate production of non-carbon dioxide products from carbon dioxide. In some embodiments, the receptor layer is a reservoir for non-carbon dioxide products. In one embodiment, the receptor layer 40 includes between about 0.01 wt. % and 99.9 wt. % receptor agent.

The body 10 comprising the photocatalytic film 30 and/or receptor layer 40 may be capable of removing carbon dioxide from gases at ambient conditions. In some embodiments, the body 10 may be capable of removing carbon dioxide from gases at temperatures of not greater than about 50° C., such as at temperatures of not greater than about 40° C., such as at temperatures of not greater than about 30° C., such as at temperatures of not greater than about 25° C., such as at temperatures of not greater than about 20° C., such as at temperatures of not greater than about 15° C., or even temperatures of not greater than 10° C. Although high relative humidity (e.g., a relative humidity greater than 50%) facilitates production of non-carbon dioxide products from carbon dioxide, in some embodiments, the body 10 may be capable of removing carbon dioxide from gases at low relative humidity, such as a relative humidity of not greater than about 10%, or even a relative humidity of not greater than about 1%.

The body 10 comprising the photocatalytic film 30 and/or receptor layer 40 may be capable of removing carbon dioxide from gases at non-ambient conditions. For example, the body may be capable of removing carbon dioxide at temperatures of at least about 50° C., such as at temperatures of at least about 60° C., such as at temperatures of at least about 70° C., such as at temperatures of at least about 80° C., such as at temperatures of at least about 90° C., or even at temperatures of at least about 100° C. In some instances, the body may be capable of removing carbon dioxide at temperatures up to about 200° C. At temperatures of about 200° C. and above, the photocatalytic film may degrade.

As noted above, the body 10 is generally capable of removing at least about 10 ppm/minute $CO_2$ from a gas stream comprising 1% vol. $CO_2$. In one embodiment, the body 10 is capable of removing at least about 25 ppm/minute $CO_2$ from a gas stream comprising 1% vol. $CO_2$. In one embodiment, the body 10 is capable of removing at least about 100 ppm/minute $CO_2$ from a gas stream comprising 1% vol. $CO_2$. In one embodiment, the body 10 is capable of removing at least about 250 ppm/minute $CO_2$ from a gas stream comprising 1% vol. $CO_2$. In one embodiment, the body 10 is capable of removing at least about 500 ppm/minute $CO_2$ from a gas stream comprising 1% vol. $CO_2$. In one embodiment, the body 10 is capable of removing at least about 600 ppm/minute $CO_2$ from a gas stream comprising 1% vol. $CO_2$. In one embodiment, the body 10 is capable of one or more of the above-described removal rates for a period of at least about 1 hour, such as at least about 3 hours, such as at least about 6 hours, such as at least about 12 hours, such as at least about 24 hours, such as at least about 48 hours, or even at least about 72 hours. In one embodiment, the body 10 is capable of one or more of the above-described removal rates utilizing a photocatalytic film having surface area of not greater than about 1780 square inches (about 1.15 square meters), such as a surface area of not greater than about one square meter.

The rate of carbon dioxide removal via the photocatalytic film 30 and/or receptor layer 40 may be a function of one or more of light exposure duration, light exposure intensity, light wavelength, the available surface area of the photocatalytic film 30 and/or receptor layer 40, and the thickness of the photocatalytic film 30 and/or receptor layer 40, to name a few. In one embodiment, the light (L) is a natural source, such as sun light. In one embodiment, the light (L) is an artificial source. In one embodiment, the light (L) comprises electromagnetic energy in the ultraviolet range.

The surface area and thickness of the photocatalytic film 30 and/or receptor layer 40 may be chosen based on application (e.g., to achieve tailored carbon dioxide removal rates). In one embodiment, the photocatalytic film 30 has a thickness of at least about 0.1 micron, such as a thickness of at least about 0.5 micron, or a thickness of at least about 1.0 micron. In some embodiments, the photocatalytic film 30 may have a thickness of not greater than about 10 microns. In one embodiment, the surface area of the photocatalytic film 30 is tailored by employing high surface area substrates, such as honeycomb-type substrates, microporous carbon, zeolites, alumina spheroids, and metal foams, to name a few. In related embodiments, the surface area of the receptor layer 40 is tailored by employing high surface area substrates. Other substrates 20 and bodies 10 are discussed in further detail below.

As noted, the body 10 facilitates conversion of carbon dioxide to non-carbon dioxide products. Furthermore, the body 10 may increase removal rates of pollutants from the surface of substrates 10 relative to conventional photocatalytic coatings. As used herein, "pollutant" means waste mater that contaminates the air, water or soil; as used herein, pollutant does not include nitrogen, oxygen, carbon dioxide, and water; non-limiting examples of pollutants includes vaporous organics, sulfur oxides (SOx), nitrogen oxides (NOx), ammonia, and hydrogen sulfides.

In particular, bodies including at least the photocatalytic film 30 (and sometimes the receptor layer 40) may facilitate increased cleaning rates relative to conventional self-cleaning coatings. For example, the photocatalytic film 30 may facilitate increased removal rates of dirt and other particle types from the surface of the body 10. Thus, in some embodiments, substrates comprising the photocatalytic film 30 may be considered self-cleaning substrates, such as described in commonly owned U.S. Patent Application No. 60/909,138, filed Mar. 30, 2007, entitled "Self-cleaning aluminum alloy substrates", which is incorporated herein by reference in its entirety.

The photocatalytic film 30 and/or receptor layers 40 may be transparent, translucent, opaque or a combination thereof (e.g., a first portion is transparent and another portion is translucent). In one embodiment, at least one of the photocatalytic film 30 and receptor layer 40 is transparent, and light may thus be transmitted to the substrate 20 and/or other layers. In a related embodiment, the photocatalytic film comprises semiconductor particles 34 having an average particle size of not greater than about 100 nm. The photocatalytic film 30 is generally permeable so as to facilitate communication between outside materials (e.g., carbon dioxide or pollutants) and one or more of the semiconductor particles 34, the charge transfer agent 36, receptor layer 40, or the substrate 20.

The photocatalytic film 30 may be of any size and shape suited to remove carbon dioxide from gases. The size and shape of the receptor layer 40 generally is coincidental to the size and shape of the photocatalytic film 30. Hence, in one embodiment, the size and shape of the receptor layer 40 is substantially congruent with the size and shape of the photocatalytic film 30. In other embodiments, the receptor layer 40 is larger than the photocatalytic film 30 (e.g., has a larger surface area and or a larger thickness than the photocatalytic film 30). In other embodiments, the receptor layer 40 is smaller than the photocatalytic film 30 (e.g., has a smaller surface area and or a smaller thickness than the photocatalytic film 30). Thus, tailored bodies and carbon dioxide removal rates may be facilitated.

Receptor agent R is generally in communication with the photocatalytic film 30 so as to facilitate production of non-carbon dioxide products. In the illustrated embodiments, the receptor agent R is included in a layer separate from the photocatalytic film 30 (e.g., the receptor layer 40). In some embodiments, some receptor agent R may be included within the photocatalytic film 30. In less preferred embodiments, a receptor layer is absent from the body 10 and the receptor agent R is included in other layers, such as the photocatalytic film 30 and/or other layers or the body. In the illustrated embodiments, the receptor layer 40 is included between the substrate 20 and the photocatalytic film 30. In other embodiments, the receptor layer 40 may be located on top of the photocatalytic film 30, and thus the photocatalytic film 30 may be between the substrate 20 and the receptor layer 40 (e.g., when the receptor layer 40 is transparent).

The photocatalytic film 30 is generally produced from a composition comprising a semiconductor material and a film former. In one embodiment, the composition utilized to produce the photocatalytic film 30 is a mixture, such as a solution, a colloid, or a suspension, to name a few. As used herein, a "solution" means, relative to liquid phase materials, a homogenous mixture of a solute dissolved in a solvent. As used herein, "colloid" means a heterogeneous mixture that visually appears to be a homogenous; examples of colloids include emulsions, sols, foams and gels. As used herein, "emulsion" means a colloid of two immiscible liquids. As used herein, "sol" means a colloid that has a continuous liquid phase and a solid suspended in the liquid phase. As used herein, "foam" means a colloid that has a continuous liquid phase and a gas suspend in the liquid phase. As used herein, "gel" means a colloid that has a continuous solid phase a liquid suspended in the solid phase. As used herein, a "suspension" means, relative to liquid phase materials, a mixture of two substances, one of which is a liquid, the other a finely divided solid dispersed in the liquid; the suspended particles will settle over time if left undisturbed, which distinguishes a suspension from a colloid.

In one embodiment, the mixture utilized to produce the photocatalytic film comprises a solvent and at least one of: (i) semiconductor particles; and (ii) a precursor to the semiconductor particles ("semiconductor precursor"). As used herein, "semiconductor precursor" means a substance from which semiconductor particles may form. Some useful semiconductor precursors are described below.

Figure 3:
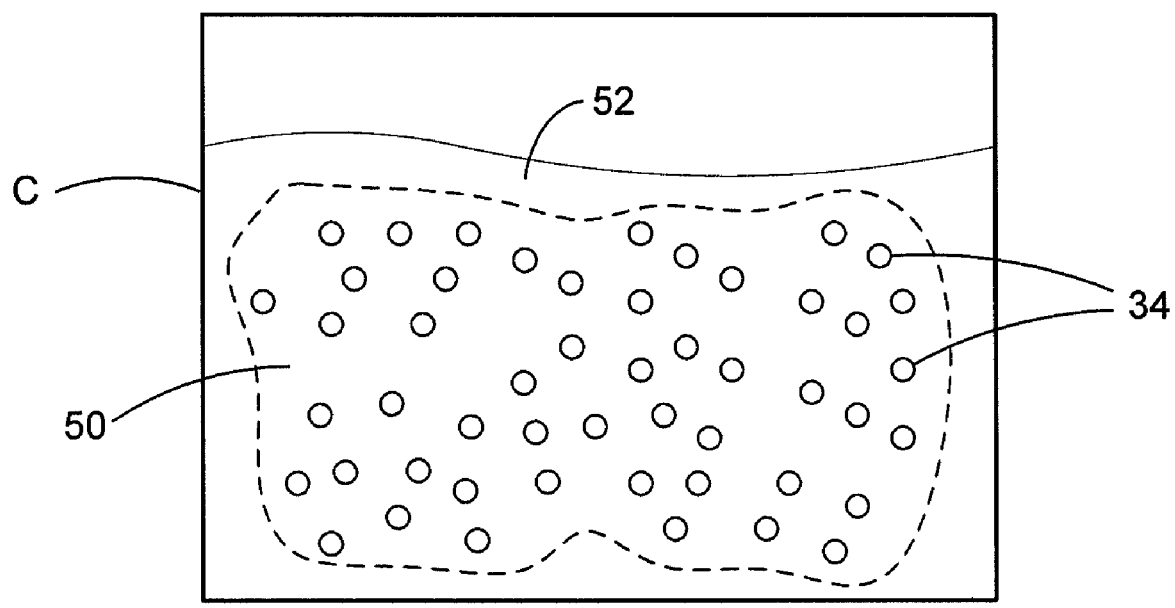
FIG. 3 illustrates one embodiment of a mixture for producing a photocatalytic film.

One embodiment of a mixture capable of producing a photocatalytic film is illustrated in FIG. 3. In the illustrated embodiment, a container (C) includes a mixture 50 capable of producing a photocatalytic film. The mixture 50 includes a solvent 52, semiconductor particles 34 dispersed in the solvent 52, and a film former (not illustrated) dissolved in the solvent 52. The mixture 50 may optionally comprise semiconductor precursor, charge transfer agent 36 and/or a precursor to the charge transfer agent ("CTA precursor"). As used herein, CTA precursor means a substance from which charge transfer agent(s) may form. The mixture 50 may optionally comprise pollution attraction agents (not illustrated) and/or a precursor to the pollution attraction agents ("PAA precursors"). Pollution attraction agents and PAA precursors are described below.

The solvent 52 may be an aqueous-based solvent, may be an organic solvent, or may be a combination thereof. In one embodiment, the solvent 52 is aqueous. In another embodiment, the solvent 52 is organic, such as an alcohol. In another embodiment, the solvent 52 comprises a mixture of an aqueous-based solvent and an organic solvent. In this embodiment, the ratio of aqueous-based solvent to organic solvent may be adjusted to tailor the properties of the mixture 50, such as, for example, the pH, hydrophobicity, hydrophilicity, viscosity, and/or vapor pressure of the mixture 50.

The semiconductor particles 34 may be any of the above-described semiconductor particles. In one embodiment, the semiconductor particles 34 comprise titanium dioxide in anatase form and the solvent is an aqueous solvent. Commercially available mixtures similar to this embodiment include the TPX family of mixtures produced by Kon Corporation (Japan) and marketed by Green Millennium, Inc. of San Dimas, Calif. In another embodiment, the semiconductor particles 34 are titanium dioxide in anatase form and the solvent is an organic solvent. Commercially available mixtures similar to this embodiment include the Hydrotect family of mixtures produced by Toto Ltd. of Fukuoka, Japan.

As noted, the mixture 50 includes a film former. The film former may be dissolved within the solvent 52, or the film former may comprise a colloid or suspension with the solvent 52. The film former may be utilized to create the matrix 32 of the photocatalytic film 30, and thus may be considered a precursor to the matrix 32. In this regard, the film former may be any suitable material that forms an amorphous and/or crystalline phase matrix. In one embodiment, the film former material includes a semiconductor material. In one embodiment, this semiconductor material of the film former is coincidental to the semiconductor material of the semiconductor particles and/or a semiconductor precursor. For example, the film former may comprise an acid comprising a metal. In one embodiment, the metal of the acid is a metal that is similar to, or equivalent to, the metal of the semiconductor. Thus, in this embodiment, when the matrix 32 is formed via the mixture 50, the semiconductor particles 34 and the matrix 32 may have similar material properties.

In one embodiment, the film former comprises peroxotitanic acid, commonly referred to as PTA. Upon application of the mixture 50 to the substrate 20, or an intermediate layer of the body 10, the peroxotitanic acid may form an amorphous phase comprising at least some titanium dioxide. In a related embodiment, the semiconductor particles 34 may comprise titanium dioxide in anatase form. Thus, one photocatalytic film produced from the mixture 50 may include an amorphous network of titanium dioxide (the matrix) including crystalline titanium dioxide particles (the semiconductor particles) included therein.

Semiconductor precursor may be included in the solvent 52. The semiconductor precursor may be dissolved in the solvent 52, or the semiconductor precursor may comprise a colloid or suspension with the solvent 52. The semiconductor precursor may be capable of forming semiconductor particles 34 during formation of the photocatalytic film 30. For example, the semiconductor precursor may comprise peroxotitanic acid.

If utilized in the mixture 50, the charge transfer agent 36 may be any of the above-described charge transfer agents 36. In one embodiment, the charge transfer agent comprises an alkali salt. In one embodiment, the charge transfer agent is an oxide or hydroxide of sodium. CTA precursors may also/alternatively be utilized within the mixture. Some useful CTA precursors include those capable of forming alkaline materials within the photocatalytic film The amount of charge transfer materials in the mixture 50 should generally not exceed the amount of semiconductor particles and/or semiconductor precursor in the mixture. As used herein, "charge transfer materials" means the combined amount of charge transfer agent(s) (if any) and CTA precursor (s) (if any). In one embodiment, the mixture 50 generally comprises at least about 0.01 wt % charge transfer materials. In one embodiment, the mixture 50 comprises not greater than 5.0 wt % charge transfer materials. In one embodiment, the mixture 50 includes charge transfer materials in the range of about 0.01 wt % to 5.0 wt %. In one embodiment, the mixture 50 comprises at least about 0.05 wt % charge transfer materials. In one embodiment, the mixture 50 comprises not greater than about 1.0 wt % charge transfer materials. In one embodiment, the mixture 50 includes charge transfer materials in the range of about 0.05 wt % to 1.0 wt %. In one embodiment, the mixture 50 comprises about 0.85 wt % semiconductor particles and 0.5 wt % charge transfer materials.

As noted above, the photocatalytic film 30 may include a pollution attraction agent to attract pollutants toward the body 10. Likewise, the mixture 50 may include a pollution attraction agent, or a PAA precursor. As used herein, a "pollution attraction agent" means a material that attracts one or more pollutants towards that material. As used herein, "PAA precursor" means a substance that may form a pollution attraction agent. Some useful pollution attraction agents include minerals, such as clays and phosphates. In one embodiment, the pollution attraction agent comprises apatite. In another embodiment, the pollution attraction agent comprises smectite. In another embodiment, the pollution attraction agent comprises kaolin clay. Thus, in some embodiments, the pollution attraction agent may be a silicate-based mineral, a phosphate-based mineral, or a combination thereof. The pollution attraction agent may be in the mixture 50 in a particulate form, or the pollution attraction agent may be dissolved in the mixture 50. The mixture 50 generally comprises not greater than about 10 wt % of the pollution attraction agent or PAA precursor. The pollution attraction agents may be of any suitable particle size within the mixture 50. In one embodiment, the size of the pollution attraction agents are selected such that the mixture 50 may be sprayed via conventional techniques onto a substrate surface without clogging of the spraying device.

The mixture 50 generally is in a liquid form for ease of application to the substrate 20 or an intermediate layer of the body 10. The mixture may have a pH selected to restrict precipitation of components therein, such as precipitation of agents and/or precursors (e.g., semiconductor agent/precursor, charge transfer agent/precursor, pollution attraction agent/precursor). In one embodiment, the mixture comprises an aqueous solvent, titanium dioxide particles, peroxotitanic acid, and an alkaline material. In this embodiment, the mixture may comprise a pH in the range of 6.0 to 8.0, such as a pH in the range of 7.2 to 7.4.

The physical properties of the mixture 50 may be tailored to suit the photocatalytic film production method. For example, the viscosity and vapor pressure of the mixture 50 may be selected and tailored via selection of suitable solvent 52. Similarly, the mixture 50 may be selected to be hydrophilic or hydrophobic based on the properties of the substrate 20 or the intermediate layer of the body 10. An organic solvent may be utilized with the mixture 50 when hydrophobic properties are desired. An aqueous solvent may be utilized with the mixture 50 when hydrophilic properties are desired.

Similar to the photocatalytic film 30, the receptor layer 40 may be produced from a composition comprising receptor material(s). In one embodiment, a receptor agent R or a receptor agent precursor (sometimes referred to herein as "RAP") is dissolved in a solvent, thereby producing a mixture. As used herein a "receptor agent precursor" is a substance from which receptor agent may form. The amount of receptor agent materials within the mixture is generally application specific. As used herein, "receptor agent materials" means the combined amount of receptor agent(s) (if any) and receptor agent precursors (if any). In one embodiment, the mixture 50 generally comprises at least about 0.01 wt % receptor agent materials. In one embodiment, the mixture 50 comprises not greater than 5.0 wt % receptor agent materials. In one embodiment, the mixture 50 includes receptor agent materials in the range of about 0.01 wt % to 5.0 wt %. In one embodiment, the mixture 50 comprises at least about 0.05 wt % receptor agent materials. In one embodiment, the mixture 50 comprises not greater than about 1.0 wt % receptor agent materials. In one embodiment, the mixture 50 includes receptor agent materials in the range of about 0.05 wt % to 1.0 wt %. In other embodiment, since the receptor layer 40 may comprise up to about 100% receptor agent R, the receptor layer 40 may be produced from particles, pellets or other materials predominately made of or completely made of receptor agent R.

The properties of the mixture for producing the receptor layer 40 may be tailored so as to facilitate production of the receptor layer 40 via various application methods. For example, the viscosity, vapor pressure, pH, hydrophilicity, and/or hydrophobicity may be tailored (e.g., via the solvent) based on the type of apparatus used to apply the mixture to a layer of the body and/or the hydrophilic or hydrophobic properties of the body 10. In one embodiment, the solvent is aqueous. In another embodiment, the solvent is organic, such as an alcohol.

Referring back to FIGS. 1-2, the substrate 20 may be any suitable layer or base adapted to have a photocatalytic film 30 and/or receptor layer 40 disposed thereon. As used herein, "disposed on", "disposed thereon", and the like, means that a first layer is physically connected to a second layer, such as in a direct physical contact, but does not require that the two layers be in direct physical contact with one another. For example, in the illustrated embodiment, the receptor layer 40 is disposed on the substrate 20 and the two layers are in direct physical contact with one another. In the illustrated embodiment, the photocatalytic film 30 is also disposed on the substrate 20, but is not in direct physical contact with the substrate 20 due an intermediate layer (e.g., the receptor layer 40 in the illustrated embodiment) between the photocatalytic film 30 and the substrate 20

The substrate 20 may comprise rigid or flexible materials. The substrate 20 may comprise one or more of metals, metal alloys and non-metallic materials. The substrate 20 may also be of any suitable structure, such as a planar structure, a honeycomb structure, an accordion structure and a radiator structure, to name a few. In this regard, the surface area of the substrate 20 may be tailored to facilitate sufficient surface area for interaction between gases containing carbon dioxide and the photocatalytic film 30. In some embodiments, the substrate 20 may comprise high-surface area materials, such as zeolites, microporous carbon, pellets, and metal foams, to name a few. Other high-surface area materials may be utilized as the substrate 20.

In one embodiment, the substrate 20 comprises at least one of a metal and a metal alloy. In one embodiment, the metal is an aluminum-based metal, such as pure or nearly pure aluminum metals. In another embodiment, the metal is an aluminum alloy. Types of aluminum alloy substrates include nonheat treated metals, as well as heat-treated metals, including any 1XXX, 2XXX, 3XXX, 4XXX, 5XXX, 6XXX, 7XXX, and 8XXX series alloys (Aluminum Association designation). The metal and metal alloys may comprise foams, such as aluminum metal foams. Aluminum metal foams may be useful as substrates 20 in that such foams may already include receptor agent therein. Aluminum foams also have a large surface area, which facilitates mass transfer between the photocatalytic film and the gases containing carbon dioxide. The aluminum foams may be closed-cell aluminum foams or may be open-cell aluminum foams.

In another embodiment, the metals may be surface treated metals, such as surface treated aluminum metals. In one embodiment, the aluminum metals are cleaned via conventional techniques, such as via dilute acid or alkaline treatment. In another embodiment, the aluminum metals may be anodized and/or sealed. In one embodiment, the anodized aluminum metals may include aluminum metals at least partially anodized with titanium dioxide. In another embodiment, the aluminum surface may be a sealed aluminum surface, such as an anodized aluminum body with a polymerically-sealed surface. In this regard, the polymer may be a silicon-containing organic, such as any of the films disclosed in commonly owned U.S. Pat. No. 6,440,290, which is incorporated herein by reference.

Other metals may also be utilized as the substrate 20. For example, the substrate 20 may be an iron-based layer, such as a steel-containing layer. Other metal materials and alloys may be employed. In one embodiment, metal or metal alloy within the substrate may act as a receptor agent R. For example, with aluminum-based substrates, aluminum may act as a receptor agent to form aluminum carbonate via the photocatalytic layer. In this example, a separate receptor layer 40 may not be required.

In one embodiment, the substrate 20 comprises a device capable of producing electricity. In one embodiment, the substrate comprises a photovoltaic cell, also commonly called a solar cell. As used herein, a "photovoltaic cell" means any device capable of converting electromagnetic energy into electricity. Thus, the photocatalytic film 30 in combination with receptor agent R and one or more solar cells may define a system capable of both converting solar energy to electricity and removing carbon dioxide from gases.

Figure 4:
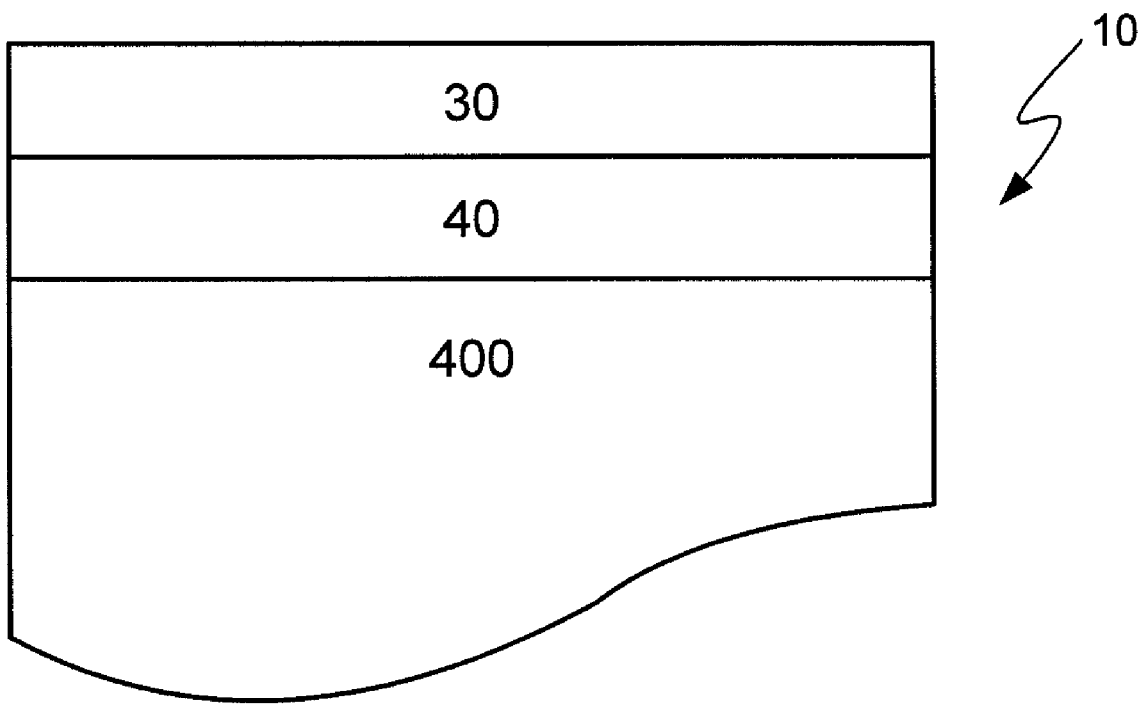
FIG. 4 illustrates one embodiment of a body suited for simultaneous production of electricity and removal of carbon dioxide from gases.

One embodiment of a solar cell adapted to remove carbon dioxide from gases and/or exhibit self-cleaning properties is illustrated in FIG. 4. A photocatalytic layer 30 and a receptor layer 40 are disposed on a solar cell 400. The photocatalytic layer 30 and receptor layer 40 may be any of the above-described photocatalytic layers and receptor layers, respectively. The operation of the solar cell 400 is generally well know. Thus, as light is absorbed by the solar cell 400, electricity may be produced. Concomitant to the production of electricity via the solar cell 400, the photocatalytic film 30 may remove carbon dioxide from gases. Additionally, concomitant to the production of electricity and/or removal of carbon dioxide from gases, the photocatalytic film may also act as a self-cleaning surface, as described in U.S. Patent Application No. 60/909,138, filed Mar. 30, 2007, and incorporated herein by reference. Thus, the body 10 may define a multi-functional and environmentally friendly body. As illustrated, the solar cell comprises a single face solar cell array. However, other arrangements may be employed, such as bi-facial solar cell arrays and the instant photocatalytic films and/or receptor layers may be employed with any such faces of the photovoltaic cell.

In other embodiments, the substrate is a solar collection panel and a photocatalytic layer 30 and a receptor layer 40 are disposed thereon. As used herein, a "solar collection panel" means any device capable of converting electromagnetic radiation to non-electrical energy (e.g., heat). Thus, the photocatalytic film 30 in combination with receptor agent R and one or more solar collection panels may define a system capable of both converting solar energy to non-electrical energy and removing carbon dioxide from gases.

Non-metallic materials may also be employed as the substrate 20. For example, plastics, glass, composites, fibers, ceramics, cements, laminates, particulates, meshes, sieves, aerogels, papers, and combinations thereof, to name a few, may be utilized as the substrate 20. In one approach, the substrate 20 may comprise mixtures of metals and non-metallic materials. For example, the substrate 20 may comprise metal sheets sandwiching a polymeric sheet therebetween. Conversely, the substrate 20 may comprise non-metallic materials sandwiching a metal material therebetween. Various other combinations exist to produce the substrate 20.

In one embodiment, the substrate comprises carbon-based bodies, such as carbon fibers, activated carbon, particulate carbon, carbon black, and the like. In one embodiment, the substrate comprises a metal oxide. In one embodiment, the substrate comprises alumina, such as gamma alumina and activated alumina, to name two, and the alumina may be of any form, such as in a tabular or pellet form, to name two.

The substrate may of any suitable shape. For example, the substrate may be a sphere, a spheroid, a rectangular solid, an ellipsoid, or any curved, polygonal, triangular, or other geometrical shape. The substrate may be of any suitable form, such as in the form of a particulate, sheet, slab, block, mesh, and sieve, to name a few.

The substrate may have a relatively low surface area or a relatively high surface area. In one embodiment, the substrate may have a surface area of at least about 1 $m^2$/gram, such as a surface area of at least about 50 $m^2$/gram, or a surface area of at least about 100 $m^2$/gram, or a surface area of at least about 200 $m^2$/gram, or a surface area of at least about 300 $m^2$/gram, or a surface area of at least about 400 $m^2$/gram, or even a surface area of at least about 500 $m^2$/gram.

Figure 5A:
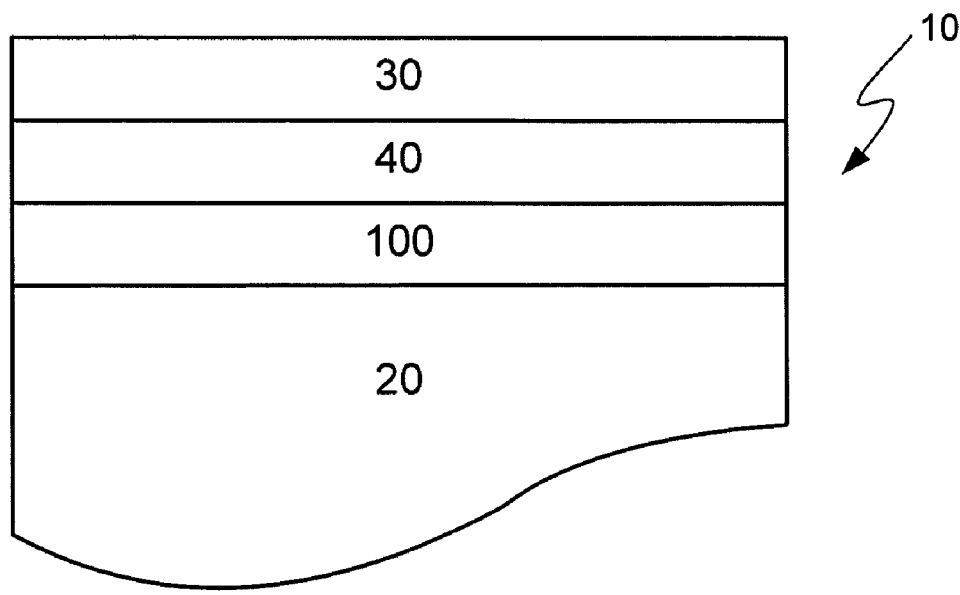
FIG. 5a illustrates another embodiment of a body suited for removing carbon dioxide from gases.

As noted above, intermediate layers may be utilized in conjunction with the substrate 20 and the photocatalytic film 30 to produce a body 10. As used herein, "intermediate layer" means any layer of material physically distinct from another layer and disposed between a top layer (e.g., a photocatalytic film layer) and a substrate. One embodiment of an intermediate layer arrangement is illustrated in FIG. 5a. In the illustrated embodiment, the body 10 includes a substrate 20, such as any of the substrates described above, a photocatalytic film 30, such as any of the photocatalytic films described above, and a receptor layer 40, such as any of the receptor layers described above. The body 10 further includes an organic layer 100. As used herein, "organic layer" means a layer comprising predominately carbon-based or polymeric-based materials. In one embodiment, the organic layer 100 is liquid (e.g., water) impermeable and may protect the underlying substrate 20 from communication with liquid water or other materials that may permeate and/or contact a surface of the body 10. In one embodiment, the organic layer 100 comprises materials produced from commercially available products, such as latex-based paints, oil-based paints, silicon-based coatings, polymeric coatings, and others. In one embodiment, the organic layer 100 comprises colorant so as to provide the body 10 with the desired colored features.

Figure 5B:
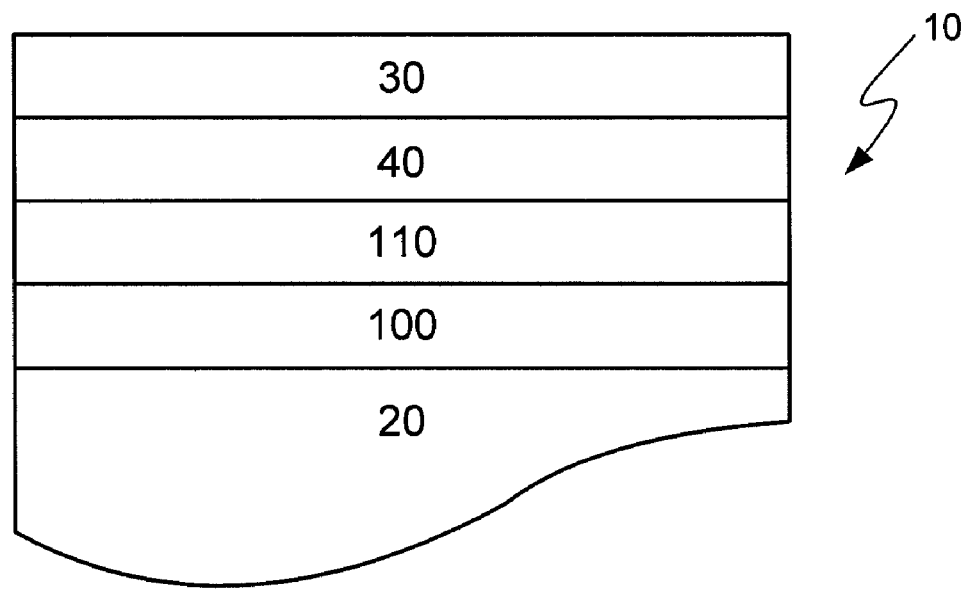
FIG. 5b illustrates another embodiment of a body suited for removing carbon dioxide from gases.

Another embodiment of a body 10 is illustrated in FIG. 5b. In the illustrated embodiment, the body 10 includes a photocatalytic film 30, a receptor layer 40, a barrier layer 110, an organic layer 100, and a substrate 20. The photocatalytic film 30, the organic layer 100, and/or the substrate 20 may be any of the above-described photocatalytic films, receptor layers, organic layers, and substrates, respectively. As used herein, "barrier layer" means a layer of material that comprises a material adapted to restrict, or even prevent, physical, chemical and/or electrical communication between one or more layers (e.g., adjacent layers). In the illustrated embodiment, the barrier layer 110 is disposed between the receptor layer 40 and the organic layer 100 to prevent/restrict communication between the receptor layer 30 and the organic layer 100. Due to its photocatalytic properties, the photocatalytic film 30 and/or receptor layer 40 may, in some instances, degrade the organic layer 100. Thus, the barrier layer 110 may be utilized to prevent/restrict the degradation of the organic layer 100 by the photocatalytic film 30. In one embodiment, the barrier layer 110 is produced from commercially available products. In one embodiment, the barrier layer comprises an amorphous material that is coincidental to the material of the semiconductor particles 34. In one embodiment, the barrier layer 110 is formed from peroxotitanic acid and is essentially amorphous titanium dioxide. For example, the barrier layer 110 may be produced from an aqueous solution, such as via mixtures produced by Kon Corporation (Japan) and marketed by Green Millennium, Inc. of San Dimas, Calif. Other commercially available products may be utilized to produce the barrier layer 110. The thickness of the barrier layer 110 may be adjusted based on application. In one embodiment, the barrier layer 110 comprises a thickness of at least about 1 micron. The barrier layer 110 may be transparent, translucent and/or opaque. In one embodiment, the barrier layer 110 is transparent but the amorphous titanium dioxide of the barrier layer 110 absorbs at least some of the UV light in communication therewith.

Figure 6:
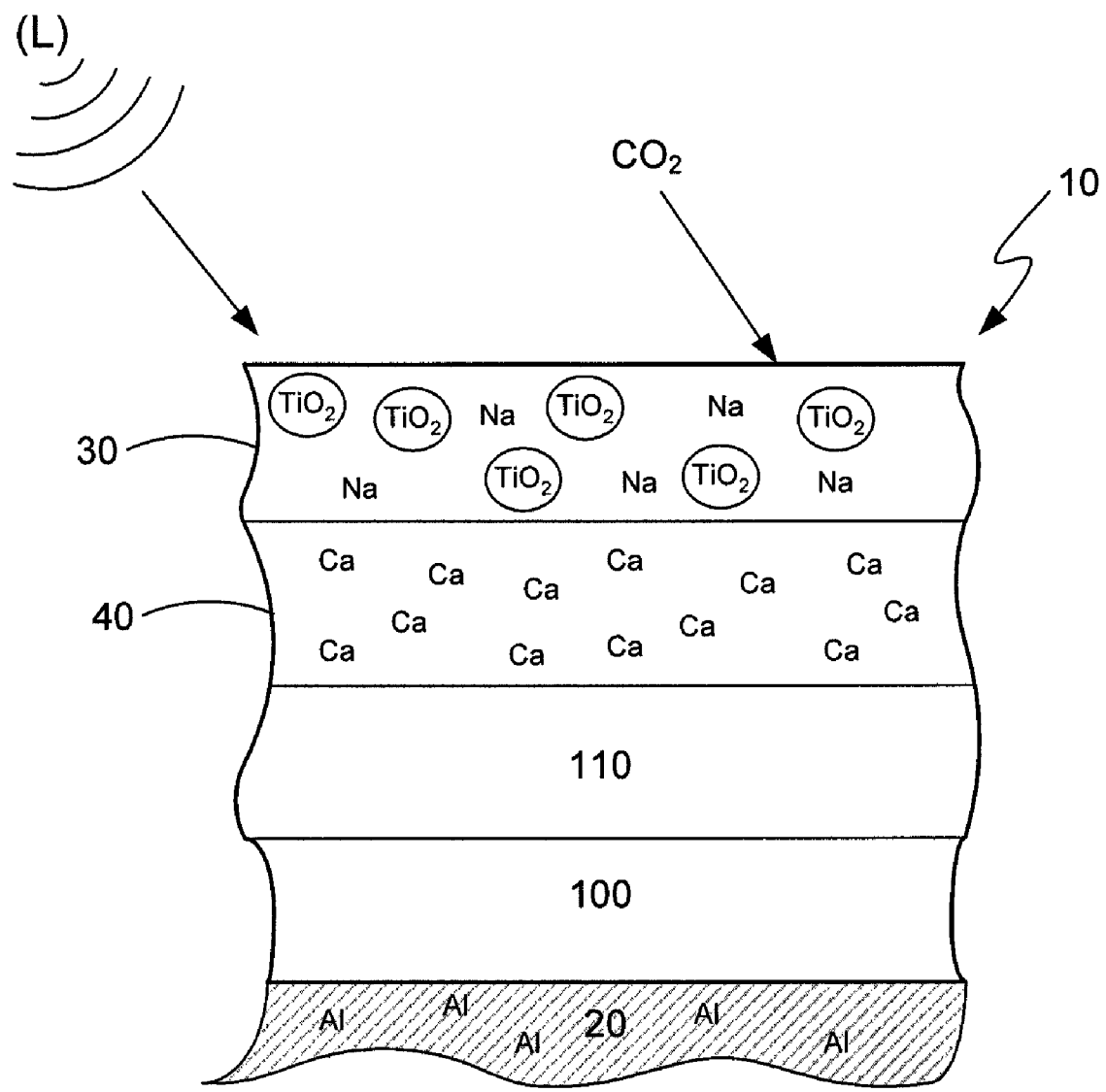
FIG. 6 illustrates another embodiment of a body suited for removing carbon dioxide from gases.
Figure 7:
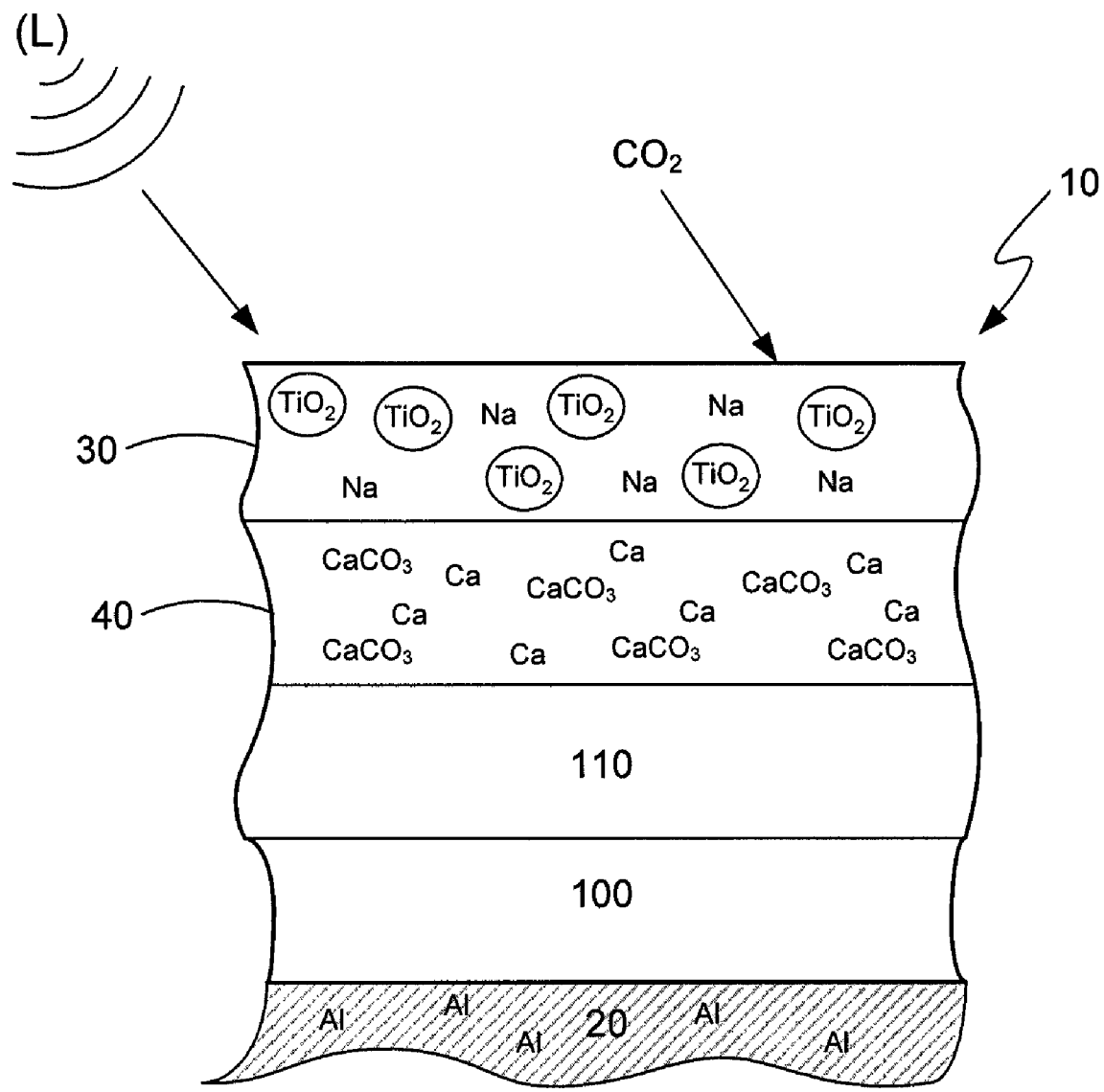
FIG. 7 illustrates another embodiment of a body suited for removing carbon dioxide from gases.

Another embodiment of a body for removing carbon dioxide from gases is illustrated in FIGS. 6-7. In the illustrated embodiment, the body 10 comprises a photocatalytic film 30 comprising a matrix of amorphous titanium dioxide, a plurality of titanium oxide particles dispersed within the amorphous titanium dioxide matrix, and a plurality of sodium materials (e.g., sodium ions) within the amorphous titanium dioxide matrix. The body 10 further includes a receptor layer 40 comprising a matrix of calcium materials. The body 10 further includes a barrier layer 110 and an organic layer 100, such as any of the above-described barrier layers and/or organic layers, respectively. The body 10 further includes a substrate 20 comprising aluminum. Such a body 10 is particularly well-suited for removing carbon dioxide from gases, and for producing non-carbon dioxide end products from carbon dioxide, such as calcium carbonate.

Figure 8:
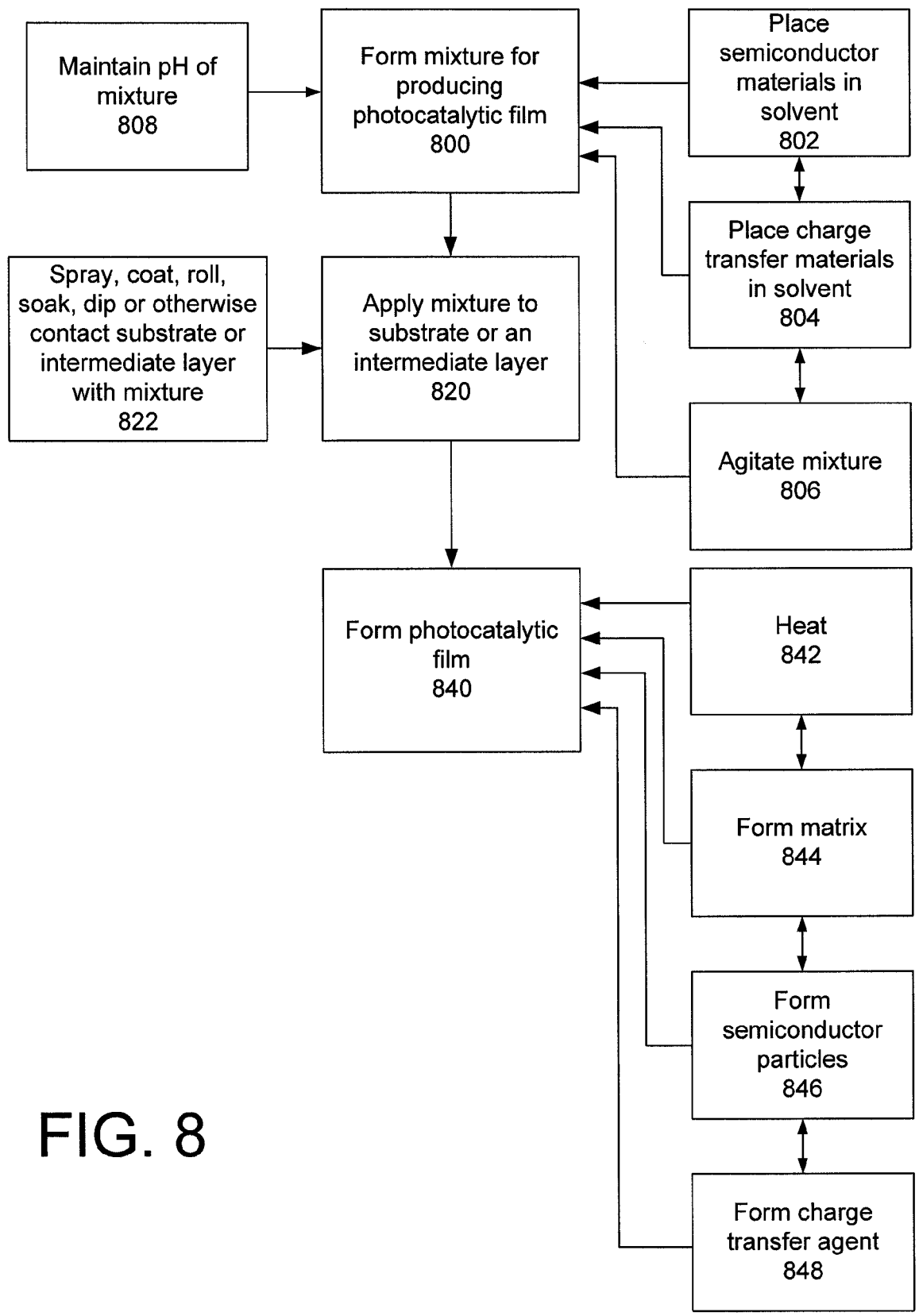
FIG. 8 is a flow chart illustrating one embodiment of methods for producing photocatalytic films.

Methods of producing photocatalytic films and methods for producing bodies containing photocatalytic films are also disclosed. One embodiment of a method for producing a body having a photocatalytic film is illustrated in FIG. 8. In the illustrated embodiment, the method includes the steps of forming a mixture for producing a photocatalytic film (800), applying the mixture to a substrate or an intermediate layer of a body (820), and forming the photocatalytic film from the mixture (840). The forming the mixture for producing a photocatalytic film step (800) may be achieved in any suitable fashion, such as by placing semiconductor materials in a solvent (802), placing charge transfer materials in solvent (804), and/or agitation of the mixture (806) (e.g., via stirring, shaking and the like). In one embodiment, charge transfer material is added to a commercially available mixture capable of producing a conventional photocatalytic film, such as mixtures available from Green Millennium, Inc. of San Dimas, Calif., or Toto Ltd. of Fukuoka, Japan. In this embodiment, charge transfer agent may be added so as to maintain the pH of the commercially available mixture (808) within tolerable limits (e.g., the normal pH of the commercially available mixture +/−0.2).

The step of applying the mixture (820) may be accomplished in any suitable manner. For example, the mixture may be sprayed, coated, rolled, soaked, dipped or otherwise put in contact with a substrate or an intermediate layer of a body (822). As described above, the mixture may comprise a hydrophilicity or hydrophobicity as necessary such that the mixture readily contacts the substrate or intermediate layer of the body upon application thereto.

The step of forming the photocatalytic film 840 may comprise applying heat (e.g., to the mixture, substrate, body, and/or intermediate layer(s)) and forming the matrix 844. In one embodiment, semiconductor particles are formed (846), and/or charge transfer agent is formed (848) during the forming step (840). As described above, the semiconductor particles and/or charge transfer agent may be formed from precursors of the mixture. For example, during or after the heating step (842), such precursors may be decompose to form semiconductor particles and/or charge transfer agent, respectively. In another embodiment, semiconductor particles and/or charge transfer agent are pre-existing within the mixture and thus, such materials may be simply formed into the matrix upon heating of the film former to create the matrix (844).

In some embodiments, the photocatalytic film comprises sufficient adhesiveness to bond with the substrate or an intermediate layer of the body. For example, the photocatalytic film may be capable of permanently bonding to the surface of the substrate without substantially pretreating the surface of the substrate. In one embodiment, the substrate comprises aluminum and the aluminum surface is cleaned with an acidic cleaner, thereby leaving the substrate with a thin layer of oxide an outer surface of the aluminum substrate. In turn, the mixture may be applied to the substrate and may permanently bond to the substrate via the aluminum oxide. In some instances, the aluminum-based substrate may comprise an anodized surface. In other instances, the aluminum-based substrate may be anodic-oxide free and thus may simply comprise the above oxide layer on an outer surface of the aluminum substrate.

Many of the above-described method steps are generally accomplished in series, although one or more of them may be accomplished in parallel. Thus, some of the above-described steps may occur concomitant to, or contemporaneous with, one or more other steps.

Figure 9:
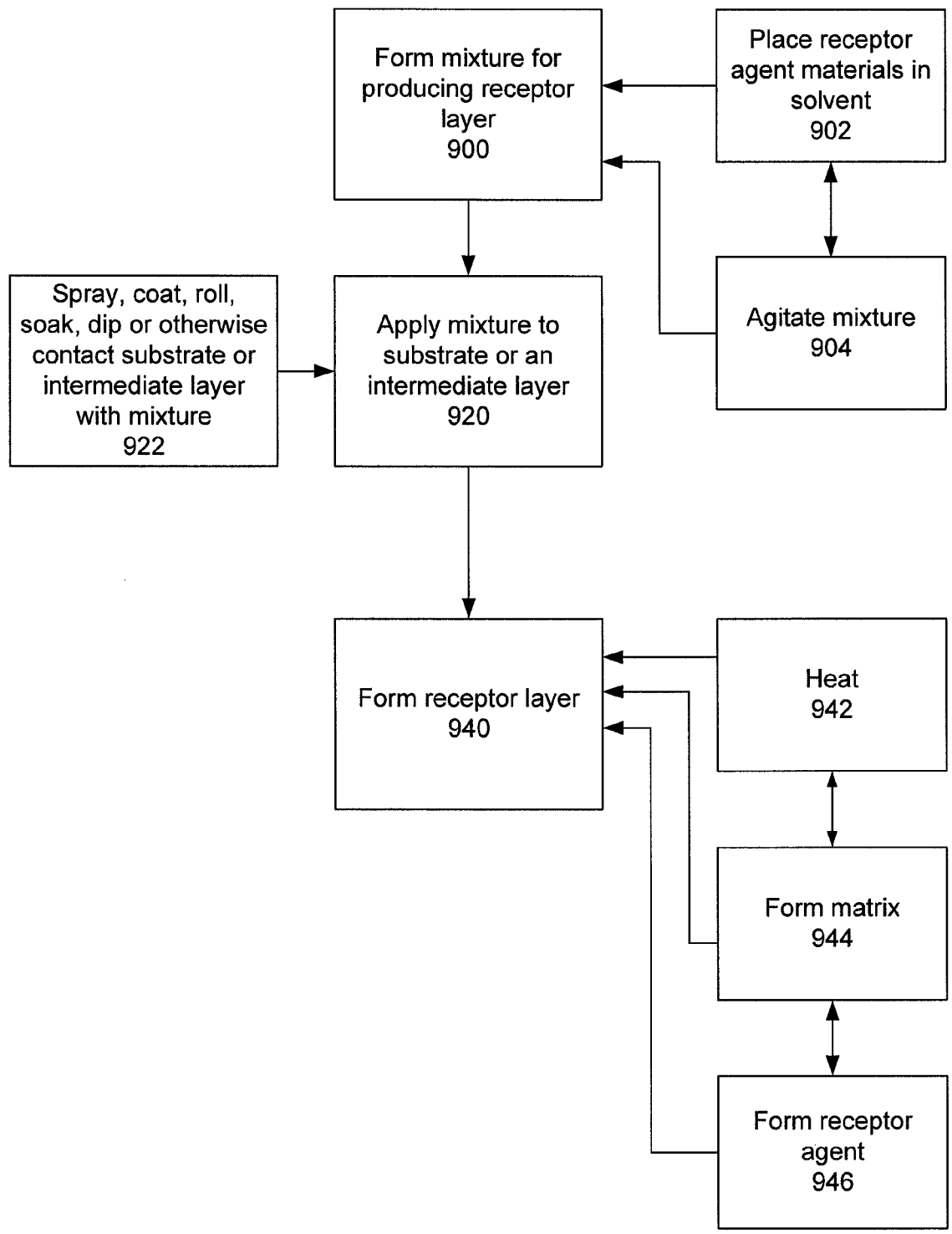
FIG. 9 is a flow chart illustrating one embodiment of methods for producing receptor layers.

Methods of forming receptor layers are also disclosed. One embodiment of a method for forming an receptor layer is illustrated in FIG. 9. Similar to above, the method may include the steps of forming a mixture for producing the receptor layer (900), applying the mixture to a substrate or an intermediate layer of a body (920), and forming the receptor layer from the mixture (940). The forming the mixture for producing a receptor layer step (900) may be achieved in any suitable fashion, such as by placing receptor materials in a solvent (902) and/or agitation of the mixture (904).

The step of applying the mixture (920) may be accomplished in any suitable manner. For example, the mixture may be sprayed, coated, rolled, soaked, dipped or otherwise put in contact with a substrate or an intermediate layer of a body (922). As described above, the mixture may comprise a hydrophilicity or hydrophobicity as necessary such that the mixture readily contacts the body or intermediate layer upon application to that material.

The step of forming the receptor layer 940 may comprise applying heat (e.g., to the mixture, substrate, body and/or intermediate layer(s)) and forming the matrix 944. In one embodiment, receptor agent is formed (946). As described above, the receptor agent may be formed from receptor agent precursors. For example, during or after the heating step (942), receptor agent precursors may decompose to form receptor agent. In another embodiment, receptor agent(s) is/are pre-existing within the mixture and thus, such receptor agent(s) may be simply formed into the matrix.

Many of the above-described method steps are generally accomplished in series, although one or more of them may be accomplished in parallel. Thus, some of the above-described steps may occur concomitant to, or contemporaneous with, one or more other steps.

Figure 10:
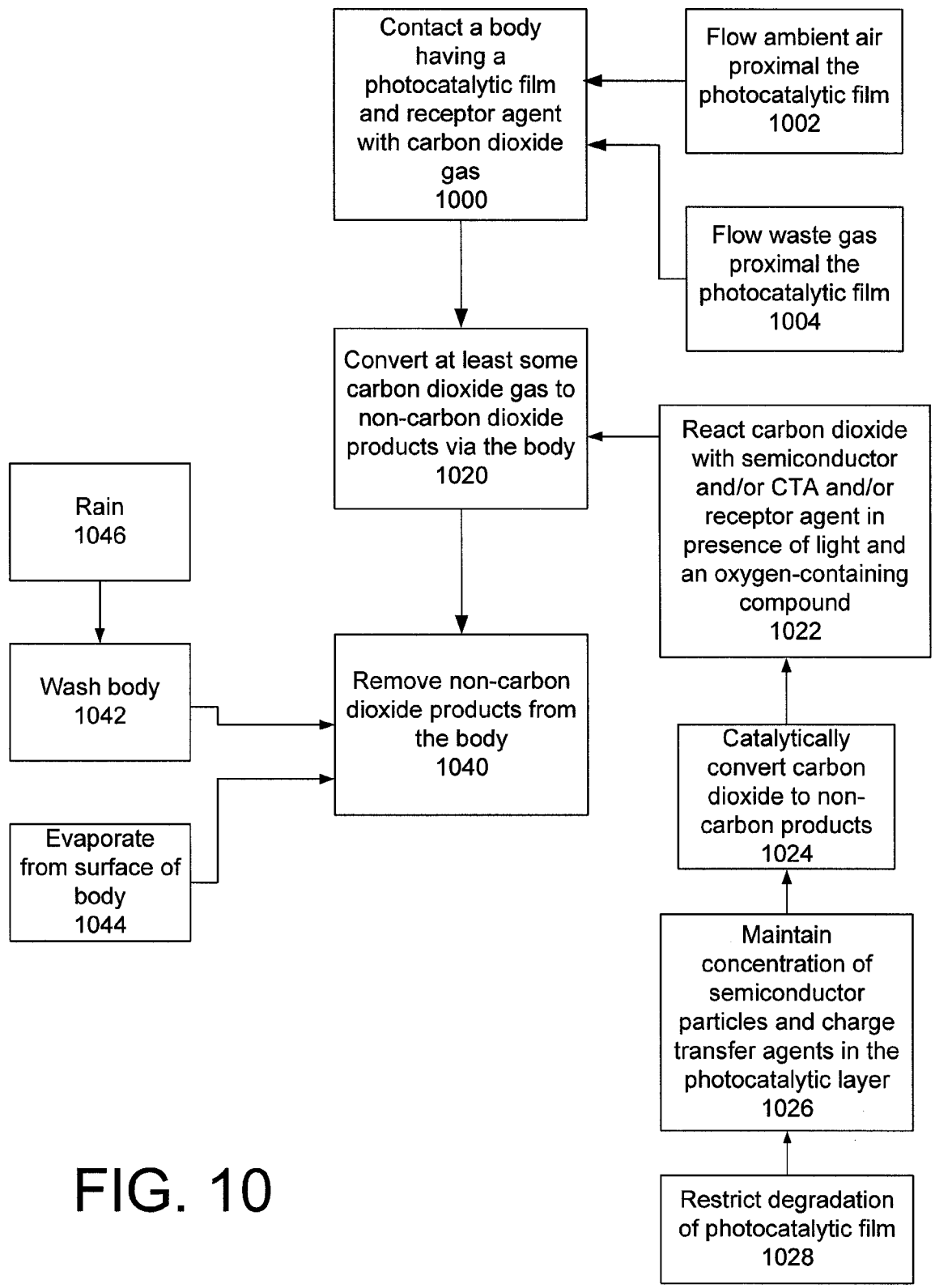
FIG. 10 is a flow chart illustrating one embodiment of methods for removing carbon dioxide from gas via photocatalytic films.

Methods for removing carbon dioxide from gases are also provided. One embodiment of a method for removing carbon dioxide is illustrated in FIG. 10. In the illustrated embodiment, the method includes the steps of contacting a photocatalytic film with carbon dioxide gas (1000) and converting at least some carbon dioxide gas to non-carbon dioxide products via a photocatalytic film and/or a receptor layer (1020). In one embodiment, the method includes the step of removing the non-carbon dioxide products from a substrate comprising a photocatalytic film (1040).

The step of contacting the photocatalytic film (1000) may be accomplished in any suitable manner. In one embodiment, the contacting a photocatalytic film step (1000) includes the step of flowing ambient air proximal the photocatalytic film (1002). For example, the substrate may comprise a building (a substrate) with a photocatalytic film and receptor layer disposed thereof. In turn, carbon dioxide in the ambient air may be removed from the ambient air via the building. In another embodiment, the contacting step (1000) may include the step of flowing waste gas proximal the photocatalytic film (1004). Such waste gas my be waste gas from any industrial process, such as waste gas from cars and other industrial processes.

The step of converting carbon dioxide gas to non-carbon dioxide products (1020) may include the of reacting, in the presence of light and/or oxygen-containing materials, carbon dioxide gas with at least one of a semiconductor material and a charge transfer agent to produce a non-carbon dioxide product (1022). In one embodiment, light energy is absorbed by one or more semiconductor particles, and energy is released. This energy may start a reaction or reaction sequence involving the charge transfer agent, carbon dioxide, receptor agent, and at least one of oxygen and water that results in the removal of carbon dioxide from gases. In one embodiment, intermediate species are produced from the catalytic interaction of carbon dioxide and the photocatalytic film, and those intermediate species may interact with receptor agent to produce non-carbon dioxide end products. By way of illustration, one or more excited electrons of one or more semiconductor particles may release energy that facilitates charge transfer between carbon dioxide and one or more charge transfer agents. For example, electrons in the valance band of one or more semiconductor particles may be excited to the conduction band. When the electrons return to their lower energy state, energy may be emitted and oxygen-containing substances may form hydroxide radicals and super oxide anions. In turn, an intermediate species (e.g., $CO_3^{2-}$) may be produced (e.g., via carbon dioxide and at least one of a hydroxide radical and a super oxide anion) and the receptor agent R may interact with the intermediate species to produce non-carbon dioxide end products (e.g., $CaCO_3$).

In a particular embodiment, the reaction is a catalytic reaction, wherein the photocatalytic film catalytically converts carbon dioxide to non-carbon products (1024). Due to this catalytic interaction, semiconductor particles and charge transfer agent may not be consumed, and thus the concentration of semiconductor particles and charge transfer agent within the photocatalytic film may be maintained/sustained (1026). Thus, degradation of the photocatalytic film due to production of non-carbon dioxide products from carbon dioxide may be restricted (1028), and in some instances prevented.

The step of removing non-carbon dioxide products from a substrate comprising the photocatalytic film (1040) may be accomplished in any suitable manner. For example, the non-carbon dioxide products may be removed by washing the substrate (1042). In one embodiment, the photocatalytic film is exposed to outside/ambient conditions, such as via on a building material or other similar substrate. In this embodiment, rain or other moisture/precipitation may be used to remove non-carbon dioxide products from the photocatalytic film/substrate. In other embodiments, the substrate may be manually cleaned, such as via a water spray or other solvent spray to remove non-carbon products from the substrate. In other embodiments, the non-carbon dioxide products may simply evaporate from the surface of the photocatalytic film and/or substrate (1044).

The photocatalytic films may be utilized in applications that require carbon dioxide removal from gases/control of carbon dioxide emissions. For example, the photocatalytic films may be employed with gas scrubbing apparatus, such as filters (e.g., in automobiles) or as an outer coating of buildings (e.g., a paint), to name two. As used herein, "gas scrubbing apparatus" means a device that removes carbon dioxide from fluids passing through that device.

Figure 11:
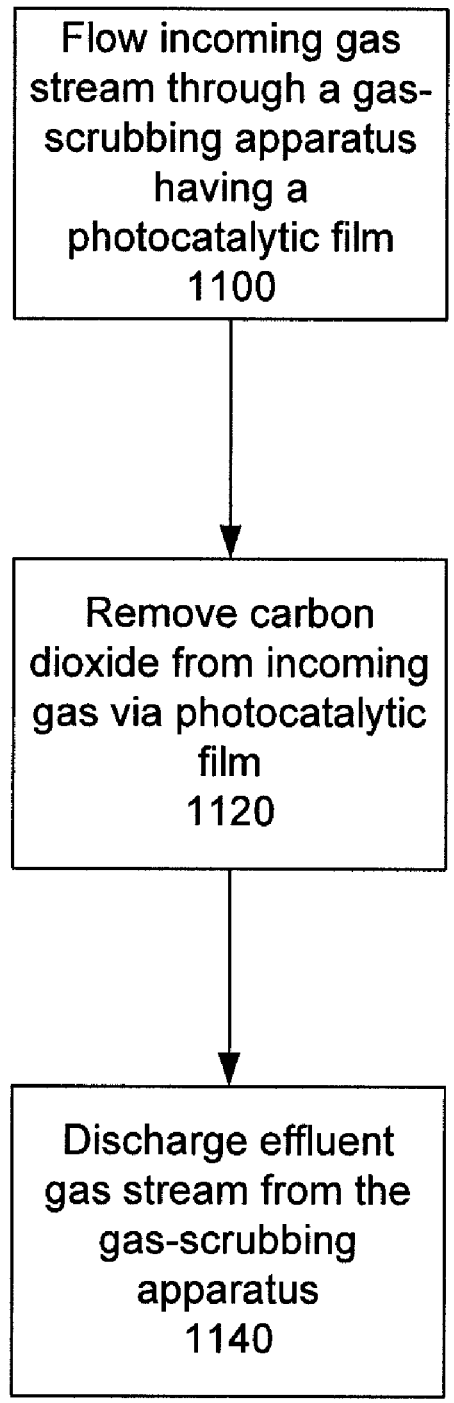
FIG. 11 is a flow chart illustrating one embodiment of a method for removing carbon dioxide from a gas stream via a gas scrubbing apparatus comprising a photocatalytic film.

One embodiment of a method for removing carbon dioxide from a gas stream via a gas scrubbing apparatus is illustrated in FIG. 11. In the illustrated embodiment, the method includes the steps of flowing an incoming gas stream comprising carbon dioxide through a gas scrubbing apparatus comprising a photocatalytic film (1100) and removing, via the photocatalytic film, carbon dioxide from the incoming gas stream (1120). The method may include the step of discharging an effluent gas stream from the gas scrubbing apparatus (1140). The effluent gas exiting the gas scrubbing apparatus generally comprises less carbon dioxide than that of the incoming gas stream. In one embodiment, the concentration of carbon dioxide in the effluent gas stream is at least about 1% less than the concentration of carbon dioxide in the incoming gas stream. In one embodiment, the concentration of carbon dioxide in the effluent gas stream is at least about 5% less than the concentration of carbon dioxide in the incoming gas stream. In one embodiment, the concentration of carbon dioxide in the effluent gas stream is at least about 10% less than the concentration of carbon dioxide in the incoming gas stream. In these embodiments, the surface area of the photocatalytic film may be not greater than about one square meter.

In one embodiment, one or more of the flowing step (1100), the producing step (1120), and the discharging steps (1140) may occur at about ambient conditions. Thus, carbon dioxide removal may be facilitated at ambient conditions. In other embodiments, the gas scrubbing apparatus may be employed at elevated temperatures, relative to ambient, to remove carbon dioxide from gases. For example, the gas scrubbing apparatus may be employed with an automobile to remove carbon dioxide from exhaust produced thereby. Such exhaust may have a temperature of at least about 70° C.

Figure 12:
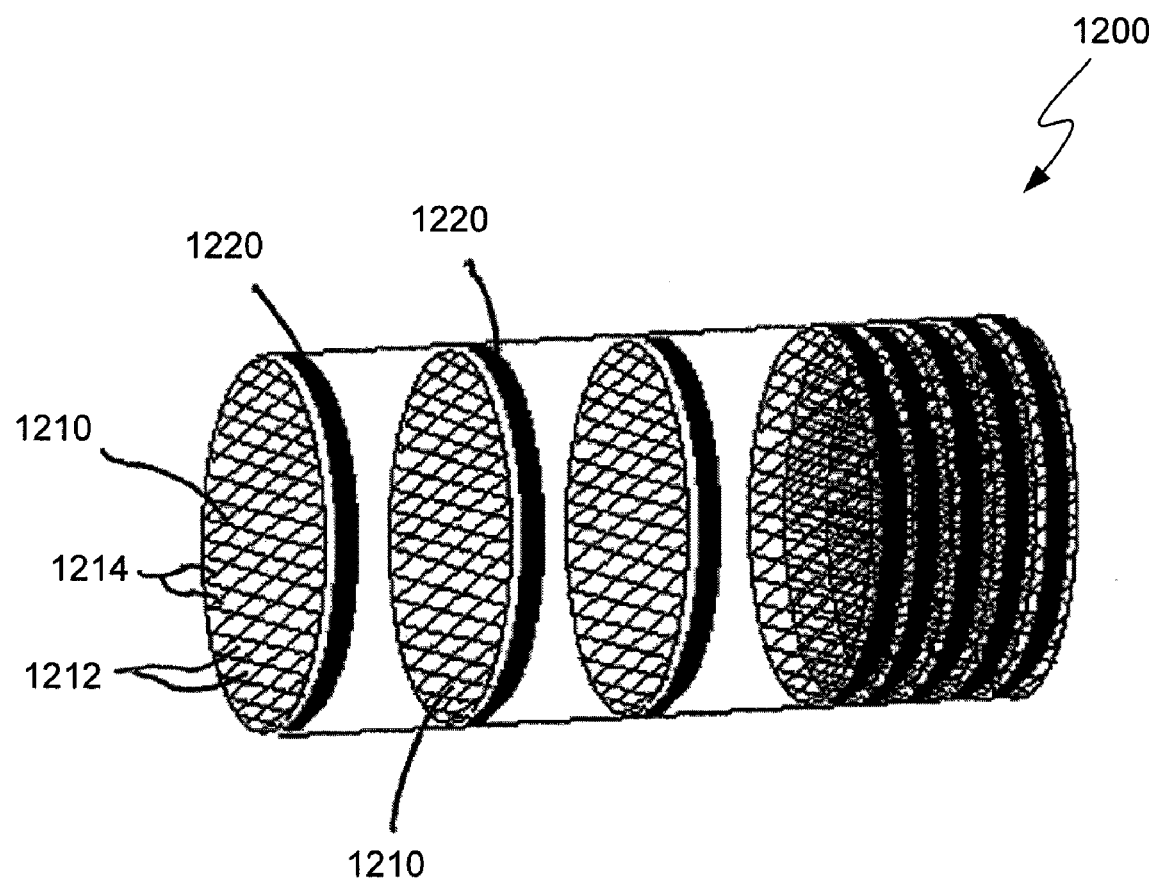
FIG. 12 is a schematic, exploded view of one embodiment of a filter capable of removing carbon dioxide from a gas stream.

One embodiment of a gas scrubbing apparatus configuration is illustrated in FIG. 12. In the illustrated embodiment, the gas scrubbing apparatus is a filter 1200 that includes a plurality of screens 1210, each screen having a spacer 1220 interconnected therewith and about the periphery thereof. The screens contains a mesh 1214 separate by a plurality of apertures 1212. At least one of a receptor layer and an photocatalytic film is disposed on the mesh 1214. Similar to as described above, at least some carbon dioxide in gases flowing through the filter 1200 via the apertures 1212 may be removed via the photocatalytic film and/or receptor layer.

Other types of gas scrubbing apparatus may be used to remove carbon dioxide from gases. For example, a bed configuration may be employed. In one approach, a bed may comprise a plurality of bodies 10 comprising photocatalytic films 30 (e.g., particulates bodies comprising photocatalytic films thereon). Gas may flow proximal/through the bed and carbon dioxide may be removed from the gas via the bed. In one embodiment, the bed is a packed bed. In one embodiment, the bed is an open configuration. In one embodiment, the bed is a fluidized bed. Other gas scrubbing apparatus may be employed, such as rebreathers.

EXAMPLES

Below are non-limiting examples of bodies, films, layers and carbon dioxide removal techniques useful in accordance with the present invention.

Examples Relating to Production of Substrates

Example 1

Conventional Aluminum Foil with a
Sodium-Containing Photocatalytic Film and a
Receptor Layer A commercially available aluminum foil is cleaned with a A31K non-etch cleaner (Henkel Surface Technologies) at 140° F. for 2 minutes. The foil is rinsed with tap water at room temperature and is rinsed with deionized water at room temperature. The foil is coated with a 1% calcium hydroxide solution and this coating is dried to produce substrate having a receptor layer comprising calcium disposed thereon.

Sodium hydroxide is added to TPX AD (Kon Corporation) to produce a mixture comprising semiconductor particles, film former, pollution attraction agent, and about 0.5 wt % sodium hydroxide. This mixture is coated on top of the receptor layer/foil and dried to produce a photocatalytic film including sodium.

The produced photocatalytic film is exposed to carbon dioxide. A powder is produced on the film. An analysis is conducted and provides that the powder includes carbonates, potentially calcium carbonates.

Example 2

Aluminum Foam with a Sodium-Containing Photocatalytic Film

An aluminum foam having its surface skin removed to expose the closed cell structure is produced. The aluminum foam is soaked in deionzed water at room temperature for 30 minutes, and is then soaked in acetone at room temperature for 30 minutes. The aluminum foam is then dried.

Sodium hydroxide is added to TPX AD (Kon Corporation) to produce a mixture comprising semiconductor particles, film former, pollution attraction agent, and about 0.5 wt % sodium hydroxide. The aluminum foam is immersed in this mixture. The aluminum foam is removed from the mixture and the mixture is allowed to dry. An aluminum foam substrate having a photocatalytic film including sodium is produced. The aluminum of the aluminum foam may act as a receptor agent for this body.

The produced photocatalytic film is exposed to carbon dioxide. A powder is produced on the film. An analysis is conducted and provides that the powder includes carbonates, potentially aluminum carbonates.

Example 3

Aluminum Alloy Sheet with a Sodium-Containing Photocatalytic Film

A 5657 aluminum alloy sheet is cleaned with an A31K non-etch cleaner (Henkel Surface Technologies) at 140° F. for 2 minutes. The sheet is rinsed with tap water at room temperature and is rinsed with deionized water at room temperature.

Sodium hydroxide is added to TPX AD (Kon Corporation) to produce a mixture comprising semiconductor particles, film former, pollution attraction agent, and about 0.5 wt % sodium hydroxide. The aluminum alloy sheet is coated with the mixture. The sheet and the mixture are allowed to dry. An aluminum sheet substrate having a photocatalytic film (including sodium) disposed thereon is produced. The aluminum of the aluminum alloy sheet may act as a receptor agent for this body.

The produced photocatalytic film is exposed to carbon dioxide. A powder is produced on the film. An analysis is conducted and provides that the powder includes carbonates, potentially aluminum carbonates.

Example Relating to Removal of Carbon Dioxide from Gases

Example 4

Removal of Carbon Dioxide from Gas using a Mesh Filter

Figure 13:
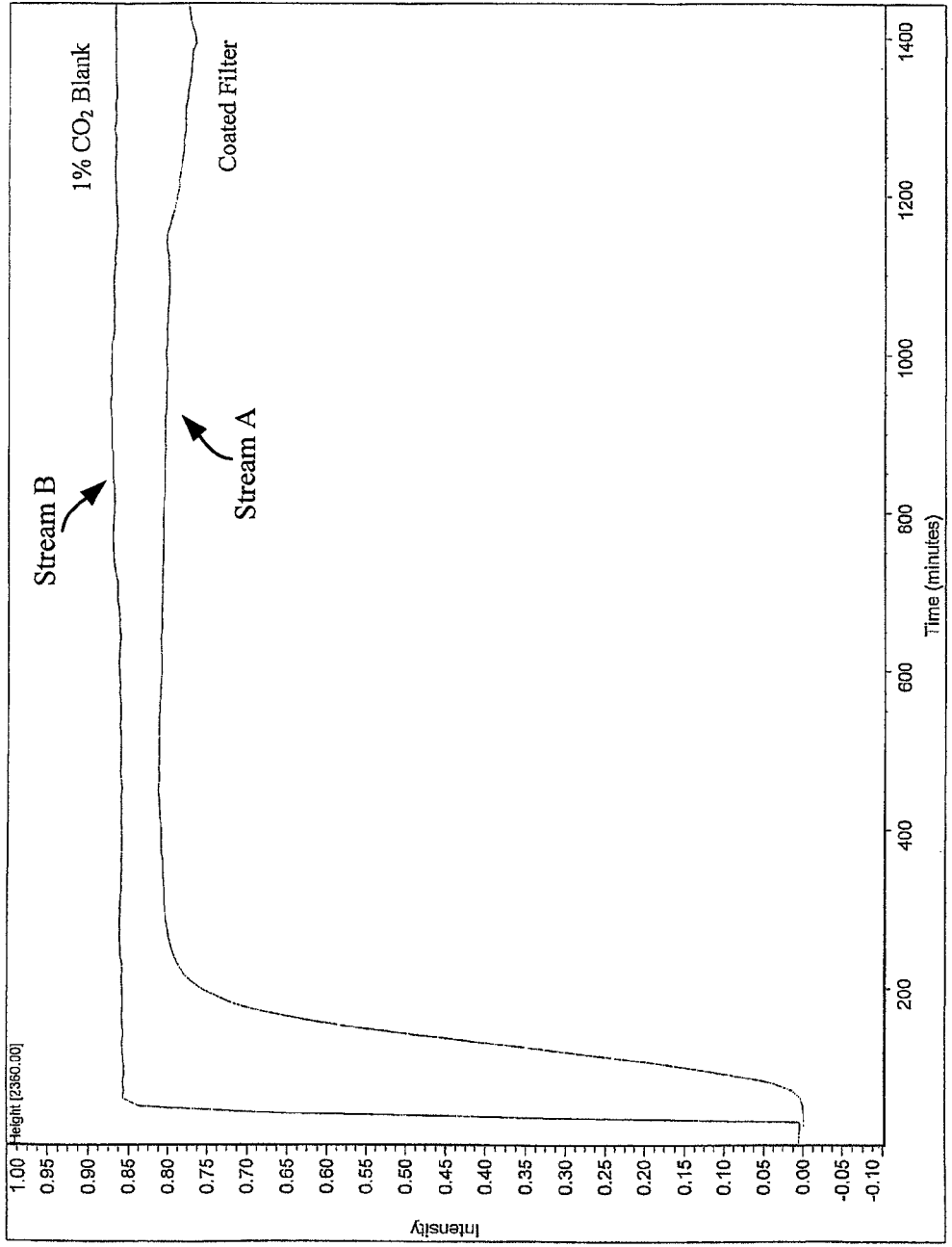
FIG. 13 is a graph illustrating FTIR absorbance intensity versus time for a 1 vol. % carbon dioxide gas run through a filter comprising a photocatalytic film and a 1% vol. carbon dioxide gas blank.

A filter similar to that illustrated in FIG. 12 is produced. Photocatalytic films comprising sodium and receptor layers comprising calcium similar to those described in Example 1 are produced on the mesh of the filter. A first gas stream comprising 1% vol. carbon dioxide gas is passed through the filter and then through a FTIR spectrometer absorbance where the gases' absorbance versus time is measured (Stream A). A second gas stream comprising 1% vol. carbon dioxide gas is also ran through a FTIR spectrometer to provide a baseline for ascertaining the amount of carbon dioxide gas removed via the filter (Stream B). The flow rate of both gas streams is about 41 ml/min. The duration of the test is about 1440 minutes. The FTIR data measurements for both Stream A and Stream B are presented in FIG. 13. The filter removes about 85.1 ml of carbon dioxide gas (approximately 84 grams $CO_2$) from the gas stream during the test period, which is about equivalent to a removal rate of about 14.4% during the test period. The non-carbon dioxide end product produced from the filter is calcium carbonate, as confirmed via x-ray diffraction.

Example 5

Removal of Carbon Dioxide from Gas Using a Packed Bed

Figure 14:
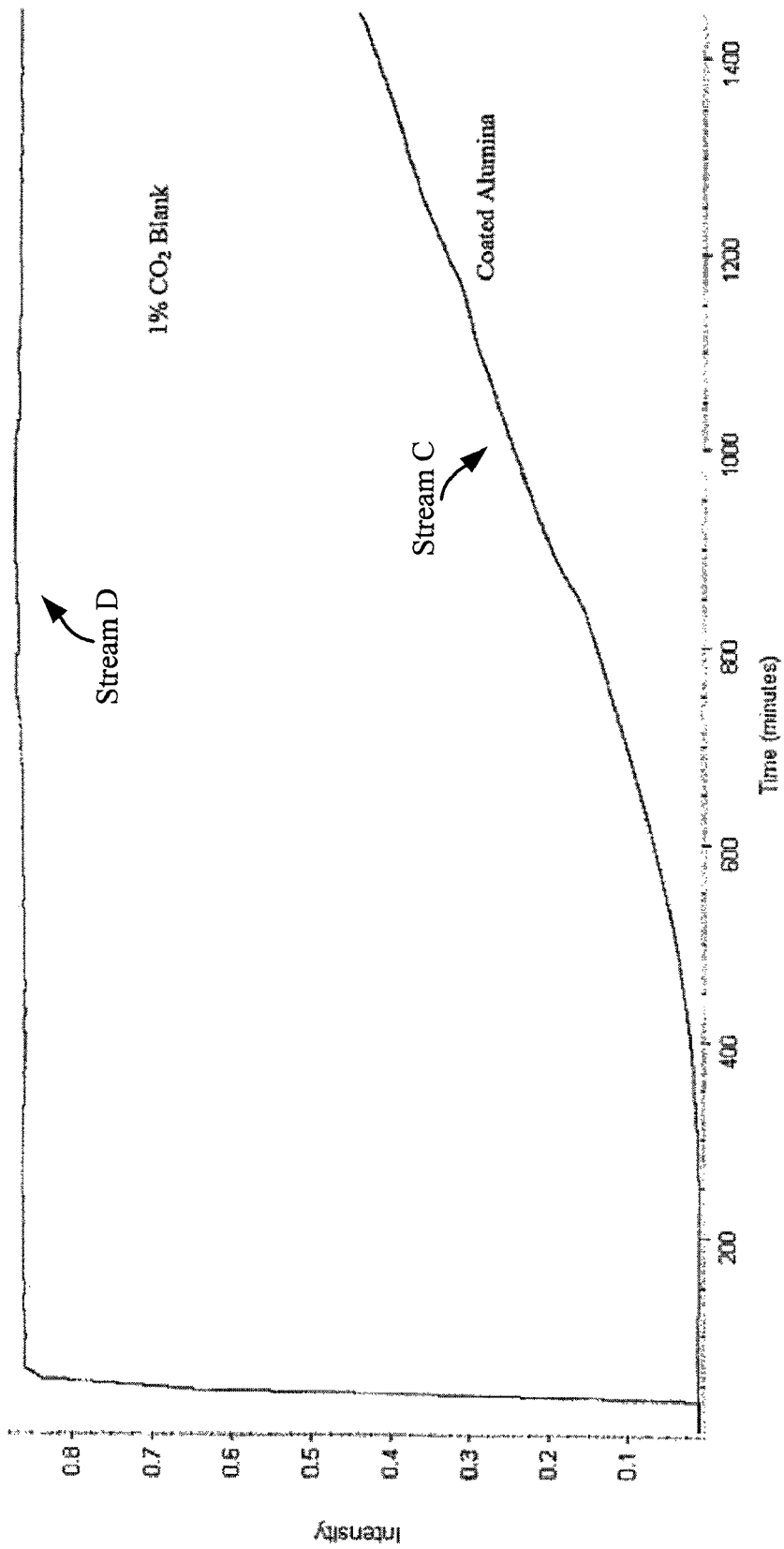
FIG. 14 is a graph illustrating FTIR absorbance intensity versus time for a 1 vol. % carbon dioxide gas run through a packed bed comprising tabular alumina having a photocatalytic film thereon and a 1% vol. carbon dioxide gas blank.

A packed bed including tabular alumina is produced, the tabular alumina pieces having photocatalytic films and receptor layers disposed thereon. The photocatalytic films and receptor layers are produced on the tabular alumina pieces in a manner similar to that described above in Example 1. The packed bed includes a shell and the tabular alumina are placed within the shell. The bed shell includes TEFLON and has a length of about seven inches (about 17.8 centimeters) and a diameter of about 1.5 inches (about 3.8 centimeters). A first gas stream comprising 1% vol. carbon dioxide gas is passed through the bed and then through a FTIR spectrometer absorbance where the gases' absorbance versus time is measured (Stream C). A second gas stream comprising 1% vol. carbon dioxide gas is also ran through a FTIR spectrometer to provide a baseline for ascertaining the amount of carbon dioxide gas removed via the bed (Stream D). The flow rate of both gas streams is about 41 ml/min. The duration of the test is about 1440 minutes. The FTIR data measurements for both Stream C and Stream D are presented in FIG. 14. The bed removes about 485.2 ml of carbon dioxide gas (approximately 478 grams $CO_2$) from the gas stream during the test period, which is about equivalent to a removal rate of about 82.2% during the test period. Indeed, the FTIR results indicate that the bed removes all measurable amounts of carbon dioxide (approximately 100% carbon dioxide removal) from Stream C during the first few hours of the test.

While the instant disclosure predominately discloses that the ratio of semiconductor particles to charge transfer agent should be at least about 1:1, in some instances it may be possible for the photocatalytic film to convert carbon dioxide to non-carbon dioxide products at ratios of less than 1:1. Thus, the instant disclosure is not limited to photocatalytic films comprising a ratio of semiconductor particles to charge transfer agent of at least about 1:1, but rather the instant disclosure expressly contemplates all films that comprise semiconductor particles and charge transfer agent, and that are capable of removing at least about 10 ppm/$CO_2$ from a gas stream comprising 1 vol. % $CO_2$ per square meter of photocatalytic film surface area.

Moreover, while various embodiments of the present invention have been described in detail, it is apparent that modifications and adaptations of those embodiments will occur to those skilled in the art. However, it is to be expressly understood that such modifications and adaptations are within the spirit and scope of the present invention.

What is claimed is:

1. A body comprising:
   a substrate;
   a photocatalytic film disposed on the substrate; and
   a receptor layer in communication with the photocatalytic film, wherein the body is capable of removing at least about 10 ppm/minute $CO_2$ gas from a gas stream comprising 1 vol. % $CO_2$ per square meter of photocatalytic film surface area.

2. The body of claim 1, wherein the photocatalytic film comprises:
   a matrix;
   semiconductor particles within the matrix; and
   a charge transfer agent within the matrix.

3. The body of claim 1, wherein the substrate comprises aluminum.

4. The body of claim 3, wherein the substrate is selected from the group consisting of aluminum alloys and aluminum foams.

5. The body of claim 4, further comprising:
   an organic layer between the substrate and the photocatalytic film.

6. The body of claim 5, further comprising:
   a barrier layer between the photocatalytic film and the organic layer.

7. A body comprising:
   a substrate;
   a photocatalytic film disposed on the substrate, wherein the photocatalytic film comprises:
      an amorphous matrix comprising titanium dioxide;
      titanium dioxide particles dispersed in the amorphous matrix; and
      an alkaline material dispersed in the amorphous matrix
   a receptor layer between the substrate and the photocatalytic film, wherein the receptor layer comprises a receptor agent;
   wherein the body is capable of removing at least about 10 ppm/minute $CO_2$ gas from a gas stream comprising 1 vol. % $CO_2$ per square meter of photocatalytic film surface area.

8. The body of claim 7, wherein the alkaline material comprises sodium.

9. The body of claim 8, wherein the receptor agent comprises calcium.

10. The body of claim 9, further comprising:
    a pollution attraction agent within the amorphous matrix of the photocatalytic film.

11. The body of claim 10, wherein the substrate comprises aluminum.

12. The body of claim 11, wherein the substrate is selected from the group consisting of aluminum alloys and aluminum foams.

13. The body of claim 12, further comprising:
    an organic layer between the substrate and the photocatalytic film.

14. The body of claim 13, further comprising:
    a barrier layer between the photocatalytic film and the organic layer.

15. The body of claim 7, wherein the substrate is a photovoltaic cell.

16. The body of claim 7, wherein the substrate predominantly comprises a non-metal.

* * * * *